United States Patent
Freund et al.

(10) Patent No.: US 7,222,359 B2
(45) Date of Patent: May 22, 2007

(54) SYSTEM METHODOLOGY FOR AUTOMATIC LOCAL NETWORK DISCOVERY AND FIREWALL RECONFIGURATION FOR MOBILE COMPUTING DEVICES

(75) Inventors: Gregor Freund, San Francisco, CA (US); Keith Haycock, San Francisco, CA (US); Conrad Hermann, Oakland, CA (US)

(73) Assignee: Check Point Software Technologies, Inc., Redwood City, CA (US)

( * ) Notice: Subject to any disclaimer, the term of this patent is extended or adjusted under 35 U.S.C. 154(b) by 1235 days.

(21) Appl. No.: 10/003,161

(22) Filed: Nov. 14, 2001

(65) Prior Publication Data

US 2003/0167405 A1    Sep. 4, 2003

Related U.S. Application Data

(60) Provisional application No. 60/308,498, filed on Jul. 27, 2001.

(51) Int. Cl.
G06F 7/04 (2006.01)
(52) U.S. Cl. .......................................... 726/3; 709/227
(58) Field of Classification Search ................ 709/225, 709/227, 249, 250, 253; 710/36, 8, 104–105, 710/107; 726/3
See application file for complete search history.

(56) References Cited

U.S. PATENT DOCUMENTS

| | | | |
|---|---|---|---|
| 4,295,039 A | 10/1981 | Stuckert | 235/380 |
| 4,914,586 A | 4/1990 | Swinehart et al. | 707/101 |
| 5,241,594 A | 8/1993 | Kung | 713/151 |
| 5,430,793 A * | 7/1995 | Ueltzen et al. | 379/93.29 |
| 5,434,918 A | 7/1995 | Kung et al. | 713/169 |
| 5,475,817 A | 12/1995 | Waldo et al. | 709/316 |
| 5,557,654 A | 9/1996 | Maenpaa | 455/411 |
| 5,586,260 A | 12/1996 | Hu | 713/201 |
| 5,588,059 A | 12/1996 | Chandos et al. | 380/279 |
| 5,602,918 A | 2/1997 | Chen et al. | 719/153 |
| 5,603,031 A | 2/1997 | White et al. | 709/317 |
| 5,623,601 A | 4/1997 | Vu | 713/201 |
| 5,655,148 A * | 8/1997 | Richman et al. | 710/8 |
| 5,710,884 A * | 1/1998 | Dedrick | 709/217 |
| 5,740,361 A | 4/1998 | Brown | 713/201 |
| 5,764,887 A | 6/1998 | Kells et al. | 713/200 |

(Continued)

*Primary Examiner*—Matthew Smithers
(74) *Attorney, Agent, or Firm*—John A. Smart; G. Mack Riddle

(57) ABSTRACT

A system providing methodologies for automatically detecting when a computing device is plugged into a new network is described. The system includes methods for detecting a connection to a new network by receiving notice of, and evaluating, changes to an existing network configuration. The system profiles and generates an identity for the new network. This includes collecting information about the network to uniquely identify it and generating a unique identifier for the network. Once a network has been profiled, a user may decide whether or not to include it as part of a trusted zone. Alternatively, this decision may be guided by policy established by a system administrator or user. The system automatically reconfigures a firewall to include or exclude the network from the trusted zone based upon this decision. The profile of each network is stored so that the next time the device is connected to the same network it remembers the network and applies the same security settings previously adopted. The stored profile also facilitates the detection of changes to the network configuration or the connection to a new network.

78 Claims, 6 Drawing Sheets

U.S. PATENT DOCUMENTS

| | | | |
|---|---|---|---|
| 5,815,574 A | 9/1998 | Fortinsky | 713/153 |
| 5,828,833 A | 10/1998 | Belville et al. | 713/201 |
| 5,832,211 A | 11/1998 | Blakley et al. | 713/202 |
| 5,838,903 A | 11/1998 | Blakely et al. | 713/202 |
| 5,857,191 A | 1/1999 | Blackwell et al. | 707/10 |
| 5,864,665 A | 1/1999 | Tran | 713/201 |
| 5,875,296 A | 2/1999 | Shi et al. | 713/202 |
| 5,881,230 A | 3/1999 | Christensen et al. | 709/203 |
| 5,987,611 A * | 11/1999 | Freund | 726/4 |
| 6,065,040 A | 5/2000 | Mima et al. | 709/202 |
| 6,075,860 A | 6/2000 | Ketcham | 713/159 |
| 6,105,100 A * | 8/2000 | Dean et al. | 710/220 |
| 6,141,755 A | 10/2000 | Dowd et al. | 713/200 |
| 6,233,618 B1 | 5/2001 | Shannon | 709/229 |
| 6,233,688 B1 | 5/2001 | Montenegro | 713/201 |
| 6,269,399 B1 | 7/2001 | Dyson et al. | 709/224 |
| 6,470,378 B1 * | 10/2002 | Tracton et al. | 709/203 |
| 6,550,012 B1 | 4/2003 | Villa et al. | 713/201 |
| 6,678,827 B1 * | 1/2004 | Rothermel et al. | 726/6 |
| 6,681,232 B1 * | 1/2004 | Sistanizadeh et al. | 707/104.1 |
| 6,738,908 B1 * | 5/2004 | Bonn et al. | 726/4 |
| 6,957,263 B2 * | 10/2005 | Galou et al. | 709/227 |
| 6,976,087 B1 * | 12/2005 | Westfall et al. | 709/238 |
| 6,988,208 B2 * | 1/2006 | Hrabik et al. | 709/208 |
| 7,017,183 B1 * | 3/2006 | Frey et al. | 726/5 |
| 2001/0002204 A1 * | 5/2001 | Jebens et al. | 375/240.01 |
| 2003/0023725 A1 * | 1/2003 | Bradfield et al. | 709/225 |
| 2003/0050973 A1 * | 3/2003 | Tracton et al. | 709/203 |
| 2005/0088980 A1 * | 4/2005 | Olkkonen et al. | 370/255 |

* cited by examiner

SYSTEM METHODOLOGY FOR AUTOMATIC LOCAL NETWORK DISCOVERY AND FIREWALL RECONFIGURATION FOR MOBILE COMPUTING DEVICES

RELATED APPLICATIONS

The present application is related to and claims the benefit of priority of the following commonly-owned provisional application(s): application Ser. No. 60/308,498 filed Jul. 27, 2001, entitled "Automatic Local Network Discovery and Firewall Reconfiguration Methodology for a Mobile Computing Device", of which the present application is a non-provisional application thereof. The disclosure of the foregoing application is hereby incorporated by reference in its entirety, including any appendices or attachments thereof, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to information processing and, more particularly, to systems and methods for regulating access and maintaining security of individual computer systems connected to local area networks (LANs) or larger open networks (Wide Area Networks or WANs), including the Internet.

2. Description of the Background Art

The first computers were largely stand-alone units with no direct connection to other computers or computer networks. Data exchanges between computers were mainly accomplished by exchanging magnetic or optical media such as floppy disks. Over time, more and more computers were connected to each other using Local Area Networks or "LANs". In both cases, maintaining security and controlling what information a computer user could access was relatively simple because the overall computing environment was limited and clearly defined.

In traditional computing networks, a desktop computer largely remained in a fixed location and was physically connected to a single local network via Ethernet. More recently, however, an increasingly large number of business and individual users are using portable computing devices, such as laptop computers, that are moved frequently and that connect into more than one network. For example, many users now have laptop computers that are plugged into a corporate network during the day and are plugged into a home network during the evening. The number of mobile computing devices, and the networks that they connect to, has increased dramatically in recent years. Computing devices can be connected to networks at home, at work, and in numerous other locations.

In addition, various different types of connections may be utilized to connect to these different networks. A dial-up modem may be used for remote access to an office network. Various types of wireless connectivity, including IEEE (Institute of Electrical and Electronics Engineers) 802.11 and Bluetooth, are also increasingly popular. Wireless networks often have a large number of different users that are occasionally connected from time to time. Moreover, connection to these networks is often very easy, as connection does not require a physical link. For example, a user can install an 802.11 wireless transceiver on the roof of his or her home to share an Internet connection with his or her neighbors. As another example, a user can be temporarily connected to a wireless network while commuting by an office building in which the network's wireless transceiver is located. Many users also connect to an increasingly large public network infrastructure. Wireless and other types of networks are frequently provided in cafes, airports, convention centers, and other public locations to enable mobile computer users to connect to the Internet. Thus, it is becoming easier for users to connect to a number of different networks from time to time through a number of different means.

In addition, a greater number of different types of mobile devices are connecting to these networks, including laptop computers, personal digital assistants (PDAs), cell phones, and various other computing devices. These mobile devices typically move frequently from location to location and connect to different networks at different times.

One of the implications of this increasing number of mobile devices occasionally connected to different networks is that traditional corporate firewall technologies are no longer effective to protect information on a mobile device. Traditional firewall products guard a boundary (or gateway) between a local network, such as a corporate network, and a larger network, such as the Internet. These products primarily regulate traffic between physical networks by establishing and enforcing rules that regulate access based upon the type of access request, the source requesting access, the connection port to be accessed, and other factors. For example, a firewall may permit access to a particular computer on port 80, but deny remote access to other computers on the network. A firewall may also permit access from a specific IP address or range (or zone) of IP addresses, but deny access from other addresses. Different security rules may be defined for different zones of addresses.

However, mobile devices that are moving from network to network are not always connected to the same physical network. The corporate firewall provides protection when the mobile device is connected to that particular corporate network, but provides no protection when the device is connected to other networks. Traditional firewall technology guarding a network boundary does not protect against traffic that does not traverse that boundary. It does not regulate traffic between two devices within the network or two devices outside the network. In addition, a mobile user often has little knowledge or control over the security systems in place on the various networks to which he or she may be connected from time to time.

One security measure that can be implemented by a mobile user is to install a personal firewall (or end point security) product on his or her mobile device to control traffic into and out of this mobile device irrespective of the network to which he or she may be connected. A personal firewall product can regulate all traffic into and out of a particular computer or device. However, in this mobile environment it is very desirable for a user to be able to distinguish between the various networks and devices to which he or she is connecting. For example, if a user is at home, he or she most likely wants to allow very open communication with other home computers and devices. On the other hand, if the user is staying in a hotel, he or she would typically prefer much more limited communication with other computers and devices in the hotel.

In the highly mobile environment described above, a significant problem is that many local networks have the same IP addresses. IP addresses on the Internet are unique, but certain address ranges are reserved for local use and not available on the Internet (e.g., 10.10.x.x, 192.168.x.x, 172.x.x.x., etc.). Many local networks show a single address (for example, their gateway server's address) to those outside the network even though there are multiple machines on the local network. A network address translation (or NAT) mechanism routes communications from outside the network to the appropriate local machine. Within a local network, IP addresses are often dynamically assigned within particular ranges by a Dynamic Host Configuration Protocol (or DHCP) server. NAT and DHCP devices used on different networks frequently use addresses within the same range (i.e., a DHCP server on network A and a DHCP server on network B will often issue the same IP address to a machine on their own network). As a result, the IP addresses of machines and devices on local networks are not unique and, in fact, are frequently duplicated on other networks.

As an illustration of this problem, assume a woman named Alice owns a laptop computer LC1, which was supplied to her by her employer. At home, Alice normally plugs the laptop into her home network N1, which is served by her home-based NAT-enabled router R1. This Ethernet network connects R1, LC1, and the other computers in her home (PC1 and PC2) together into one network. Because R1 is also a DHCP server configured with a network address of 192.168.1.0/8 (or 192.168.1.0/255.255.255.0), the DHCP server assigns LC1, PC1, and PC2 distinct IP addresses in the subnet 192.168.1.0/8 as follows:

R1: IP address=192.168.1.1
LC1: IP address=192.168.1.100; subnet mask=255,255.255.0; gateway=192.168.1.1
PC1: IP address=192.168.1.101; subnet mask=255.255.255.0; gateway=192.168.1.1
PC2: IP address=192.168.1.102; subnet mask=255.255.255.0; gateway=192.168.1.1

Alice configures her personal firewalls on LC1, PC1, and PC2 to include the subnet 192.168.1.0/8, and configures each computer's firewall rules to permit file-sharing service traffic (port 139, in Windows 98) among the computers on the local network. This allows Alice to share files between her computers, while preventing access to her files from outside the network.

When Alice takes her laptop to her office, she plugs it into a corporate network, N2, which also operates a NAT/DHCP/router R2. Although it was configured by the company's network administrator (not Alice), R2 is configured identically to Alice's home network (i.e., it provides DHCP addresses on the 192.168.1.0/8 network). Bob, Alice's coworker, uses another computer, PC3, which is plugged into the same Ethernet network N2.

R2: IP address=192.168.1.1
LC1: IP address=192.168.1.105; subnet mask=255.255.255.0; gateway=192.168.1.1
PC2: IP address=192.168.1.101; subnet mask=255.255.255.0; gateway=192.168.1.1

Although Alice's laptop LC1 is plugged into a different physical network N2 containing different computers (R2, PC3), her personal firewall treats these computers as if they were attached to her home network N1 because they have the same IP addresses. This means that, as far as the firewall is concerned, Bob's computer should be able to share Alice's files. In this case, Alice may wish to permit Bob access to files on her laptop LC1, because she knows it is a company computer and contains company data.

On a business trip Alice stays in a hotel that provides in-room Internet networking. The hotel's Ethernet network N3 uses a router R3 that is configured identically to Alice's home network N1 and the corporate network N2, so when Alice plugs her laptop LC1 into the hotel's network N3, she is assigned an identical subnet mask. Staying in the same hotel is Craig, who works for a rival company. Craig also has a laptop computer LC2, which he can plug into the hotel network and obtain an IP address from the network.

R3: IP address=192.168.1.1
LC1: IP address=192.168.1.109; subnet mask=255.255.255.0; gateway=192.168.1.1
LC2: IP address=192.168.1.120; subnet mask=255.255.255.0; gateway=192.168.1.1

Because the network is configured identically, Alice's personal firewall will permit access from anywhere in the hotel to her computer's file sharing services. This will permit Craig to read confidential company data from Alice's laptop computer LC1.

As illustrated above, mobile machines connecting to various different addresses cannot rely solely on IP addresses and subnet masks to identify a network or the machines and devices residing on the network. A mobile computer user clearly needs a way to permit reconfiguration of the personal firewall as his or her laptop is plugged into each network. However, the user may lack the technical skills to reconfigure the personal firewall, or may simply forget that the firewall needs to be reconfigured each time the laptop is connected to a different network.

One approach to handle this problem is to include or exclude a network from the trusted zone based on the physical adapter being used to connect to the network. Each network interface adapter attached to the network could be included or excluded from the trusted zone. This is perhaps a viable alternative in the case of desktop computers that are typically connected to the same network every day, but is not an effective alternative in the case of mobile computers as it requires the mobile computer user to use a different network adapter card in order to distinguish between networks. This is an excessive burden on mobile computer users.

As the above example illustrates, many networks that a mobile computer can encounter may have the same basic IP network settings. Mobile computers configured with a static trusted zone IP address configuration cannot distinguish between these networks. This may significantly compromise security as a computer is moved from network to network. In order to protect the security of the information on his or her mobile computing device in this environment, the user must either (1) configure an overly restrictive trusted zone (i.e., not trust anyone and prohibit sharing of information with other computers), or (2) reconfigure the firewall each time the computer is connected to a different network. The first option devalues the ability to have a trusted zone of computers that can share information. The second option requires the user to remember to reconfigure the firewall each time he or she connects to a different network and may also require more technical skill than many end-users possess.

Given the increasing number of mobile devices connecting to different networks, there is much interest in a mechanism to reliably identify networks and specify whether or not the network should be included or excluded from the trusted zone.

GLOSSARY

The following definitions are offered for purposes of illustration, not limitation, in order to assist with understanding the discussion that follows. 802.11: 802.11 refers to a family of specifications developed by the Institute of Electrical and Electronics Engineers (IEEE) for wireless LAN technology. IEEE 802.11, the disclosure of which is hereby incorporated by reference, specifies an over-the-air interface between a wireless client and a base station or between two wireless clients. Copies of the IEEE specifications are currently available at http://www.ieee.org. There are several specifications in the 802.11 family:

802.11—applies to wireless LANs and provides 1 or 2 Mbps transmission in the 2.4 GHz band using either frequency hopping spread spectrum (FHSS) or direct sequence spread spectrum (DSSS).

802.11a—an extension to 802.11 that applies to wireless LANs and provides up to 54 Mbps in the 5 GHz band. 802.11a uses an orthogonal frequency division multiplexing encoding scheme rather than FHSS or DSSS.

802.11b (also referred to as 802.11 High Rate or Wi-Fi)—an extension to 802.11 that applies to wireless LANS and provides up to 11 Mbps transmission in the 2.4 GHz band. 802.11b uses only DSSS. 802.11 b is a 1999 ratification to the original 802.11 standard, allowing wireless functionality comparable to Ethernet.

802.11g—applies to wireless LANs and provides 20+Mbps in the 2.4 GHz band. Bluetooth: Bluetooth refers to a short-range radio technology aimed at simplifying communications among Net devices and between devices and the Internet. It also aims to simplify data synchronization between Net devices and other computers. Products with Bluetooth technology must be qualified and pass interoperability testing by the Bluetooth Special Interest Group prior to release. The Bluetooth 1.0 specification, the disclosure of which is hereby incorporated by reference, consists of two documents: (1) the Foundation Core, which provides design specifications, and (2) the Foundation Profile, which provides interoperability guidelines. The Bluetooth specifications are currently available at http://www-.bluetooth.com.

DHCP: DHCP or Dynamic Host Configuration Protocol is a protocol for assigning dynamic IP addresses to devices on a network. With dynamic addressing, a device can have a different IP address every time it connects to the network. In some systems the device's IP address can even change while it is still connected. DHCP also supports a mix of static and dynamic IP addresses. Dynamic addressing simplifies network administration because the software keeps track of IP addresses rather than requiring an administrator to manage the task. This means that a new computer can be added to a network without the need to manually assign the computer a unique IP address. Many Internet Service Providers (ISPs) use dynamic IP addressing for dial-up users.

Endpoint security: Endpoint security is a way of managing and enforcing security on each computer instead of relying upon a remote firewall or a remote gateway to provide security for the local machine or environment. End point security involves a security agent that resides locally on each machine. This agent monitors and controls the interaction of the local machine with other machines and devices that are connected on a LAN or a larger wide area network (WAN) such as the Internet in order to provide security to the machine.

HTTP: HTTP is the acronym for HyperText Transfer Protocol, which is the underlying communication protocol used by the World Wide Web on the Internet. HTTP defines how messages are formatted and transmitted, and what actions Web servers and browsers should take in response to various commands. For example, when a user enters a Uniform Resource Locator (URL) in his or her browser, this actually sends an HTTP command to the Web server directing it to fetch and transmit the requested Web page. Further description of HTTP is available in RFC 2616: Hypertext Transfer Protocol—HTTP/1.1, the disclosure of which is hereby incorporated by reference. RFC 2616 is available from the World Wide Web Consortium (W3), and is currently available via the Internet at http://www.w3.org/Protocols/. Additional description of HTTP is available in the technical and trade literature, see e.g., William Stallings, The Backbone of the Web, BYTE, October 1996, the disclosure of which is hereby incorporated by reference.

IP Address: IP Address is an identifier for a computer or device on a TCP/IP network. Networks using the TCP/IP protocol route messages based on the IP address of the destination. The format of an IP address is a 32-bit numeric address written as four numbers separated by periods. Each number can be zero to 255. For example, 1.160.10.240 could be an IP address. Within an isolated network, IP addresses can be assigned at random as long as each one is unique. However, connecting a private network to the Internet requires using registered IP addresses (called Internet addresses) to avoid duplicate addresses. The four numbers in an IP address are used in different ways to identify a particular network and a host on that network.

MAC Address: Media Access Control Address or MAC Address is a hardware address that uniquely identifies each node of a network. In IEEE 802 networks, the Data Link Control (DLC) layer of the Open System Interconnection (OSI) Reference Model is divided into two sub layers: (1) the Logical Link Control (LLC) layer, and (2) the Media Access Control (MAC) layer. The MAC layer interfaces directly with the network media. Consequently, each different type of network media requires a different MAC layer. On networks that do not conform to the IEEE 802 standards but do conform to the OSI Reference Model, the node address is called the Data Link Control (DLC) address.

NAT: NAT or Network Address Translation is an Internet standard that enables a local-area network (LAN) to use one set of IP addresses for internal traffic and a second set of addresses for external traffic. A NAT box located where the LAN meets the Internet makes all necessary IP address translations between the LAN and the Internet. The NAT box serves two main purposes: (1) providing a type of firewall by hiding internal IP addresses, and (2) enabling a company to use more internal IP addresses. Since these internal addresses are only used internally, there is no possibility of conflict with IP addresses used by other companies and organizations. PPPoE: PPPoE is an acronym for Point-to-Point Protocol over Ethernet. PPPoE is a specification for connecting the users on an Ethernet to the Internet through a common broadband medium, such as a single DSL line, wireless device or cable modem. Further description of PPPoE is available in RFC 2516: A Method for Transmitting PPP over Ethernet (PPPoE), the disclosure of which is hereby incorporated by reference. RFC 2516 is available from the Internet Engineering Task Force and is currently available via the Internet at http://www.ietf.org/rfc/rfc2516.txt.

Subnet: A subnet is a portion of a network that shares a common address component. On TCP/IP networks, subnets are defined as all devices whose IP addresses have the same prefix. For example, all devices with IP addresses that start with 100.100.100. would be part of the same subnet. Dividing a network into subnets is useful for both security and performance reasons. IP networks are divided using a subnet mask. For purposes of this document, subnet will generally refer to a portion of a network that is served by the same router and to which data packets are typically exchanged via Ethernet connection. External machines and devices receiving packets that have been sent by the router are not part of the local subnet.

TCP: TCP stands for Transmission Control Protocol. TCP is one of the main protocols in TCP/IP networks. Whereas the IP protocol deals only with packets, TCP enables two hosts to establish a connection and exchange streams of data. TCP guarantees delivery of data and also guarantees that packets will be delivered in the same order in which they were sent. For an introduction to TCP, see, e.g., RFC 793, the disclosure of which is hereby incorporated by reference. A copy of RFC 793 is currently available at http://www.ietf org/rfc.

TCP/IP: TCPIIP stands for Transmission Control Protocol/Internet Protocol, the suite of communications protocols used to connect hosts on the Internet. TCP/IP uses several protocols, the two main ones being TCP and IP. TCP/IP is built into the UNIX operating system and is used by the Internet, making it the de facto standard for transmitting data over networks. For an introduction to TCP/IP, see e.g., RFC 1180: A TCP/IP Tutorial, the disclosure of which is hereby incorporated by reference. A copy of RFC 1180 is currently available atftp://ftp.isi. edu/in-notes/rfc1180.txt.

URL: URL is an abbreviation of Uniform Resource Locator, the global address of documents and other resources on the World Wide Web. The first part of the address indicates what protocol to use, and the second part of the address specifies the IP address or the domain name where the resource is located.

SUMMARY OF THE INVENTION

The present invention provides a system including methodologies for automatically detecting when a computer or device is plugged into a new network (or subnet). The system enables the user of the computer or device to decide whether or not he or she wants to permit the new network to be included as part of a trusted zone (i.e., a group of computers and devices amongst which information is exchanged relatively freely). Alternatively, the decision to include or exclude a newly identified network can be made by a previously established policy adopted by the user or an administrator. The system also automatically reconfigures a firewall to include or exclude the new network from the trusted zone.

The system first detects a connection to a new network by receiving notice of changes to an existing network configuration and evaluating these changes. Next, the new network is profiled and an identity is generated for the new network. The process of profiling a network involves collecting a number of items of information about the network in order to uniquely identify that specific network. This profiling process enables the system to generate a unique identifier for the network. Once a network has been identified, a user may elect whether or not that network is to be included as part of his or her trusted zone. Alternatively, the decision about whether or not to include a network as part of a trusted zone may be determined by a policy established by a system administrator or user. The new trusted zone definition, which either includes or excludes the new network, is automatically sent to the firewall for enforcement. The profile of each network is stored so that the next time the device is connected to the same network it will remember the network and apply the same security settings previously adopted for that network. The stored profile also facilitates the detection of changes to the network configuration or the connection of the device to a new network.

The system also includes configuration options that permit a system administrator or user to pre-configure the security settings of each system to identify networks that are part of the trusted zone. The system administrator or user may also pre-configure the system so that all unknown networks will be automatically excluded from the trusted zone.

DETAILED DESCRIPTION OF A PREFERRED EMBODIMENT

The following description will focus on the presently-preferred embodiment of the present invention, which is implemented in a desktop application operating in an Internet-connected environment running under a desktop operating system, such as the Microsoft® Windows operating environment running on an IBM-compatible PC. The present invention, however, is not limited to any one particular application or any particular environment. Instead, those skilled in the art will find that the system and methods of the present invention may be advantageously embodied on a variety of different platforms, including Macintosh, Linux, BeOS, Solaris, UNIX, NextStep, FreeBSD, and the like. Therefore, the description of the exemplary embodiments that follows is for purposes of illustration and not limitation.

I. Computer-Based Implementation

A. Basic System Hardware (e.g., for Desktop and Server Computers)

Figure 1:
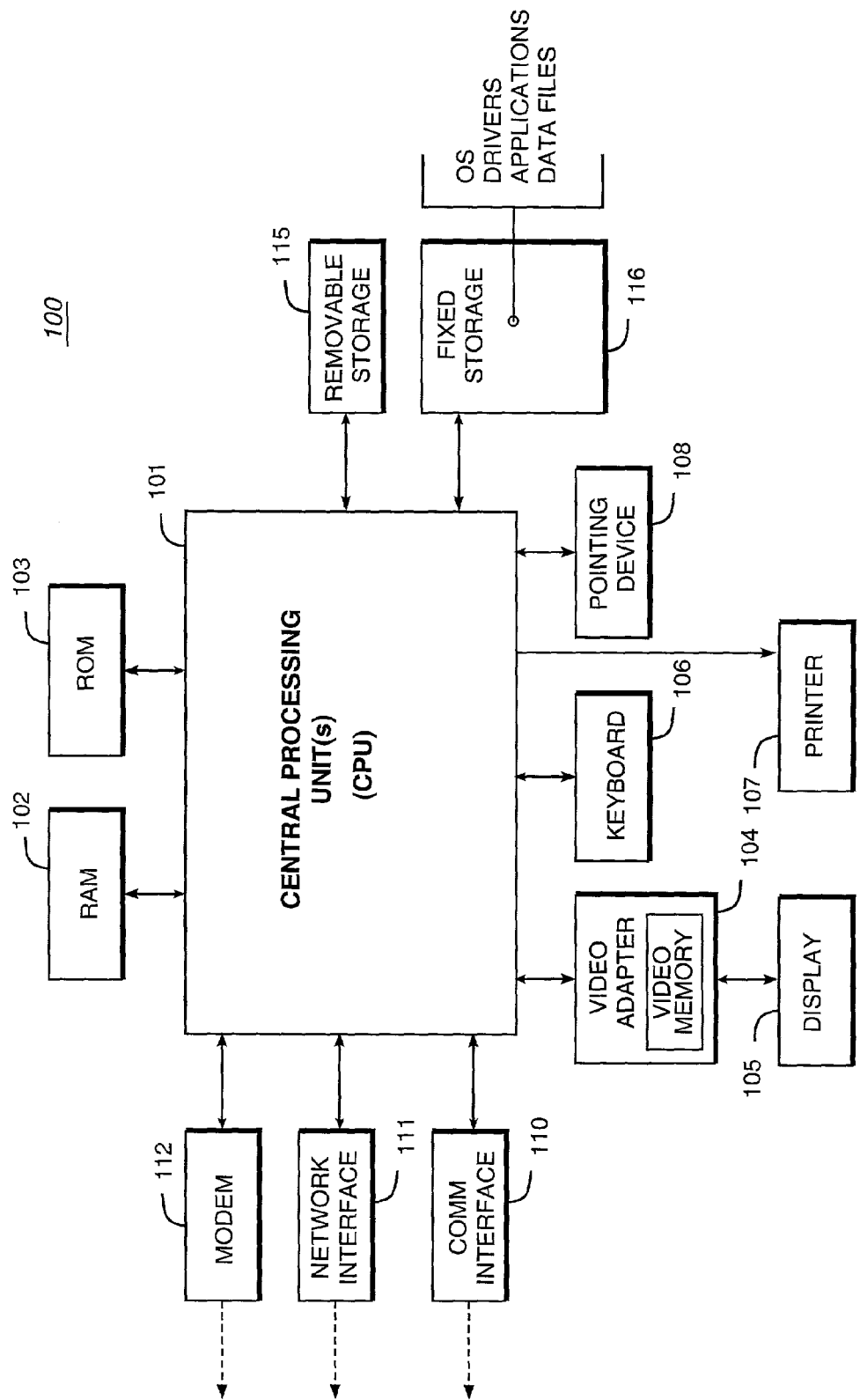
FIG. 1 is a block diagram of a computer system in which software-implemented processes of the present invention may be embodied.

The present invention may be implemented on a conventional or general-purpose computer system, such as an IBM-compatible personal computer (PC) or server computer. FIG. 1 is a very general block diagram of an IBM-compatible system 100. As shown, system 100 comprises a central processing unit(s) (CPU) or processor (s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real-time system clock is included with the system 100, in a conventional manner.

CPU 101 comprises a processor of the Intel Pentium® family of microprocessors. However, any other suitable processor may be utilized for implementing the present invention. The CPU 101communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116serves as the main hard disk for the system.

In basic operation, program logic (including that which implements methodology of the present invention described below) is loaded from the storage device or mass storage 116 into the main (RAM) memory 102, for execution by the CPU 101. During operation of the program logic, the system 100accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the display screen 105. Likewise, the pointing device 108, such as a mouse, track ball, pen device, or the like, permits selection and manipulation of objects on the display screen. In this manner, these input devices support manual user input for any process running on the system.

The computer system 100 displays text and/or graphic images and other data on the display device 105. The video adapter 104, which is interposed between the display 105 and the system, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100,may be obtained from the printer 107, or other output device. Printer 107 may include, for instance, an HP LaserJet® printer (available from Hewlett-Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

B. Basic System Software

Figure 2:
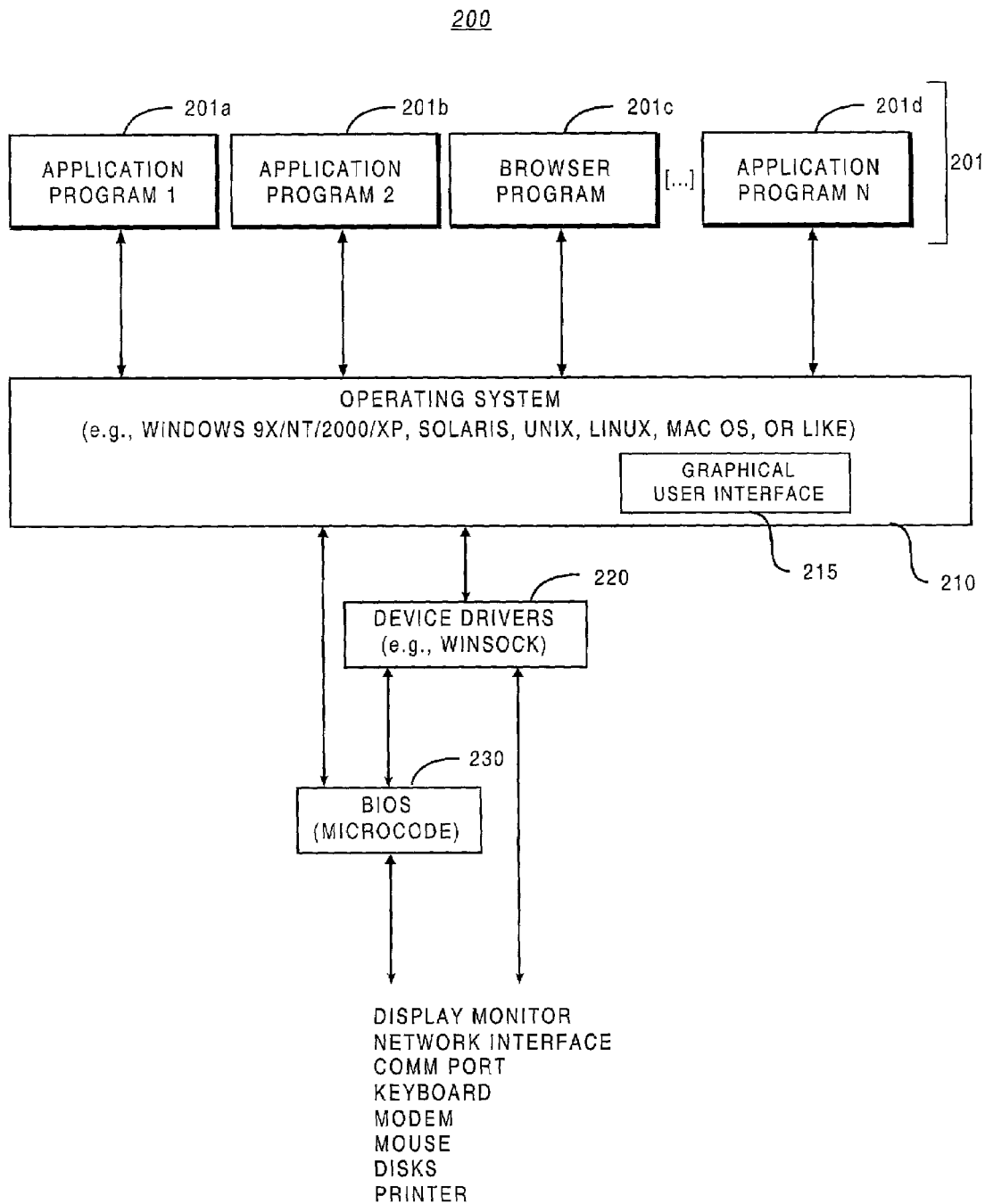
FIG. 2 is a block diagram of a software system for controlling the operation of the computer system.

Illustrated in FIG. 2, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O One or more application programs, such as client application software or "programs" 201 (e.g., 201a, 201b, 201c, 201d) may be "loaded" (i.e., transferred from fixed storage 116 into memory 102) for execution by the system 100.

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver— Windows' implementation of a TCP/IP stack) and the system BIOS microcode 230 (i.e., ROM-based microcode), particularly when interfacing with peripheral devices. OS 210 can be provided by a conventional operating system, such as Microsoft® Windows 9x, Microsoft® Windows NT, Microsoft® Windows 2000, or Microsoft® Windows XP, all available from Microsoft Corporation of Redmond, Wash. Alternatively, OS 210 can also be an alternative operating system, such as the previously-mentioned operating systems.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., Web server) that communicates with one or more "clients" (e.g., personal computers running Web browsers such as Netscape Navigator or Microsoft Internet Explorer). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

II. Automatic Local Network Discovery and Firewall Reconfiguration

A. General Design Considerations

The present invention includes a system providing methodologies for detecting and distinguishing between different networks to which a mobile computer or device is connected from time to time. The ability to detect and distinguish between networks enables different security settings to be applied by the user (or by an established security policy) depending on which network the device is connected to at that time. These security settings are then automatically applied to reconfigure the device's firewall.

Profiles of networks that have been previously detected are stored to enable identification of that same network in the future and to save the security settings previously used for that network. As new networks are identified, the user has the opportunity to choose what level of access he or she wants to permit on each network. This enables the user to reconfigure the personal firewall on his or her computer (or, in other words to apply different security settings) for each different network to which he or she is connected from time to time. Alternatively, rules can be established in advance by the user or an administrator. For example, a user may elect to exclude all new networks from the trusted zone.

New network information that is discovered can also be consulted and used in various other applications. In the currently preferred embodiment of the present invention, updated network information is consulted not only in configuration of the device's firewall, but also in several other security and policy management applications. When changes to the network are detected and network information is updated, other applications may also use the new information. For example, a security application may use the updated network information to determine whether or not to permit an application running on the local machine to access another computer.

B. Components of Network Detection and Firewall Reconfiguration System

Figure 3:
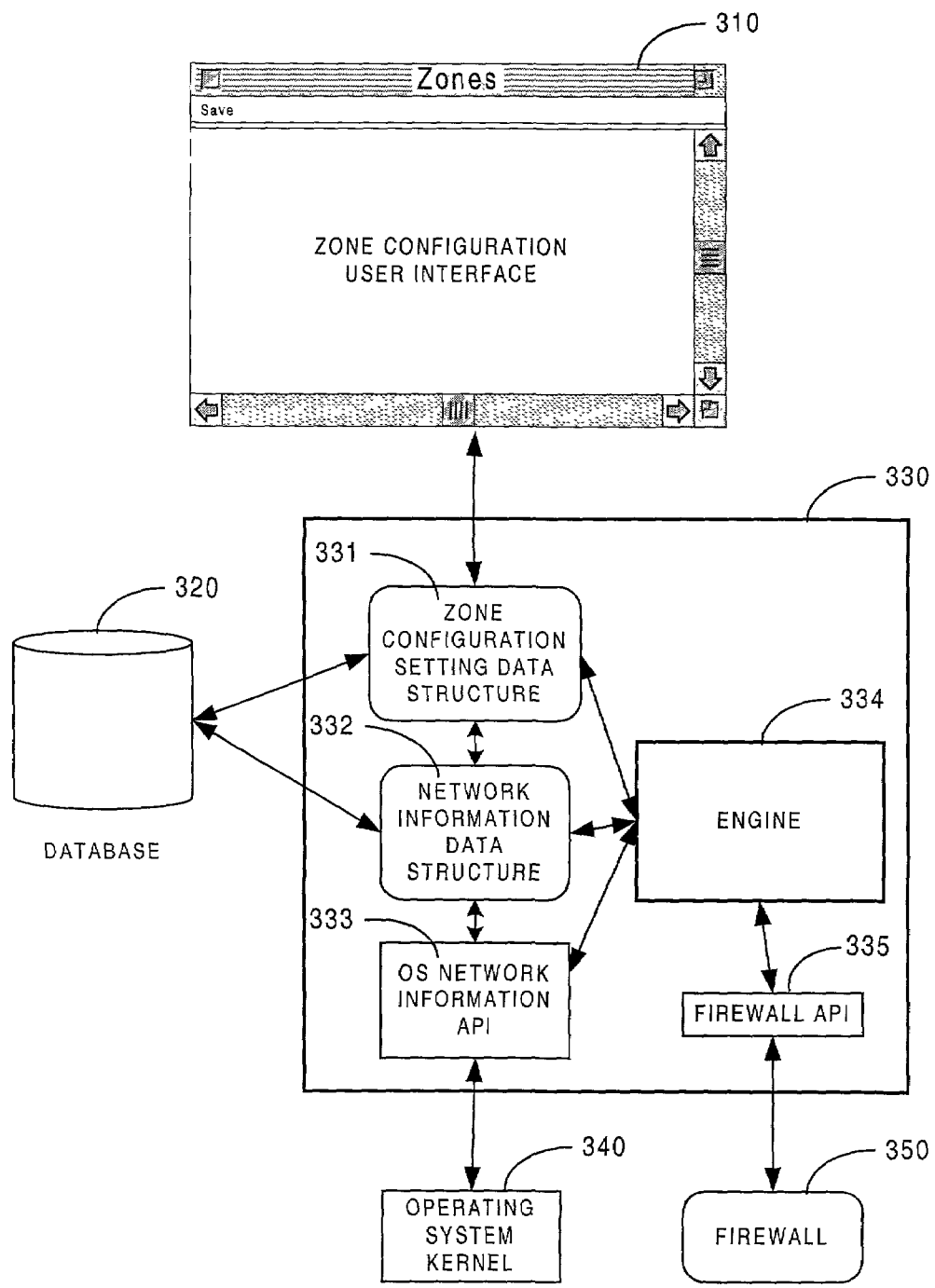
FIG. 3 is a block diagram of the network detection and firewall reconfiguration system of the present invention.

FIG. 3 is a block diagram of an environment 300 in which the network detection and firewall reconfiguration system 330 of the present invention may be embodied. As shown on FIG. 3, environment 300 includes a zone configuration user interface 310, a database 320, a network detection and firewall reconfiguration system 330, an operating system kernel 340 and a firewall 350. Network detection and firewall reconfiguration system 330 includes a zone configuration settings data structure 331, a network information data structure 332, an OS network information API 333, an engine 334, and a firewall API 335. Each of these components will now be described in more detail. Zone configuration user interface 310 is a configuration tool that enables a user or administrator to establish security settings and apply those settings to various subnets or groups of machines. Zone configuration user interface 310 is connected to the system 330. The zone configuration settings (or security settings) established for the current network are stored in the zone configuration settings data structure 331. The zone configuration settings for particular networks or groups of machines are also persistently stored in database 320. In the currently preferred embodiment, database 320 is a hierarchical object-oriented database. However, database 320 could alternatively be a relational database, a file system, or any other form of persistent storage. Network information data structure 332 includes information about the network or networks to which a device is currently connected and also contains the profile of these networks. Information regarding networks to which a device has been connected is persistently stored in database 320.

OS network information API 333 is an interface used to obtain network information from the operating system kernel 340. For example, the OS network information API 333 may be used to obtain an IP address of a particular adapter, or multiple IP addresses of devices on a particular subnet. The OS network information API 333 is also used to determine the MAC address of any router or other gateway device that is serving the local subnet. A MAC address is a unique identification number that is assigned by the manufacturer to a specific router or device. For example, when a router sends a packet to another router, the router transmitting the packet identifies itself by both an IP address and a MAC address. Each operating system provides some facility to discover network information, including IP and MAC addresses. The OS network information API 333 enables the network detection system 330 to utilize this underlying operating system facility to obtain network information that is required to detect and profile different networks. As described below, different operating systems provide different facilities for the provision of network information.

The engine 334 receives messages regarding events and uses event handlers to process and respond to these messages. The engine 334 also sends messages to other components, for example a message through firewall API 335 to make a configuration change to firewall 350. The operations of engine 334 are described in more detail below.

Firewall API 335 is used to enable dynamic configuration of firewall 350. Firewall 350 is a firewall that includes a means to configure IP address groups, which are used to specify trusted zones and other zones. For example, using the firewall API 335, a computer or device (or a group of computers and devices) can be added to a trusted zone maintained by firewall 350 without having to change the security settings applicable to that trusted zone.

C. System Data Structures

1. Network and Adapter Configuration Information

This network information data structure contains information about the local network to which a computer is connected. It includes the following information for each network interface adapter (real or virtual):

1. Connection (OSI layers 1–2) method, such as dialup, Ethernet, wireless, VPN, AOL, RAS, Token Ring, Infrared, etc.;
2. MAC address (or other OSI layer 2 address); and
3. One or more of IP address, subnet mask or gateway IP address.

For each network (corresponding to IP/subnet/gateway IP) the following information about the network is also recorded:

1. Network IP address;
2. Network mask;
3. Gateway MAC address (if private IP); and
4. Connection name (if dialup).

2. Network Profile

The system profiles the collection of data properties necessary to distinguish one network from another where appropriate, and to recognize as identical a previously profiled network. This network profile information is stored so that an existing network profile can be recreated from the stored information and compared with the profile of a newly encountered network. The process of profiling a network is described in more detail below.

D. Operation of Network Detection and Firewall Reconfiguration System

Figure 4A:
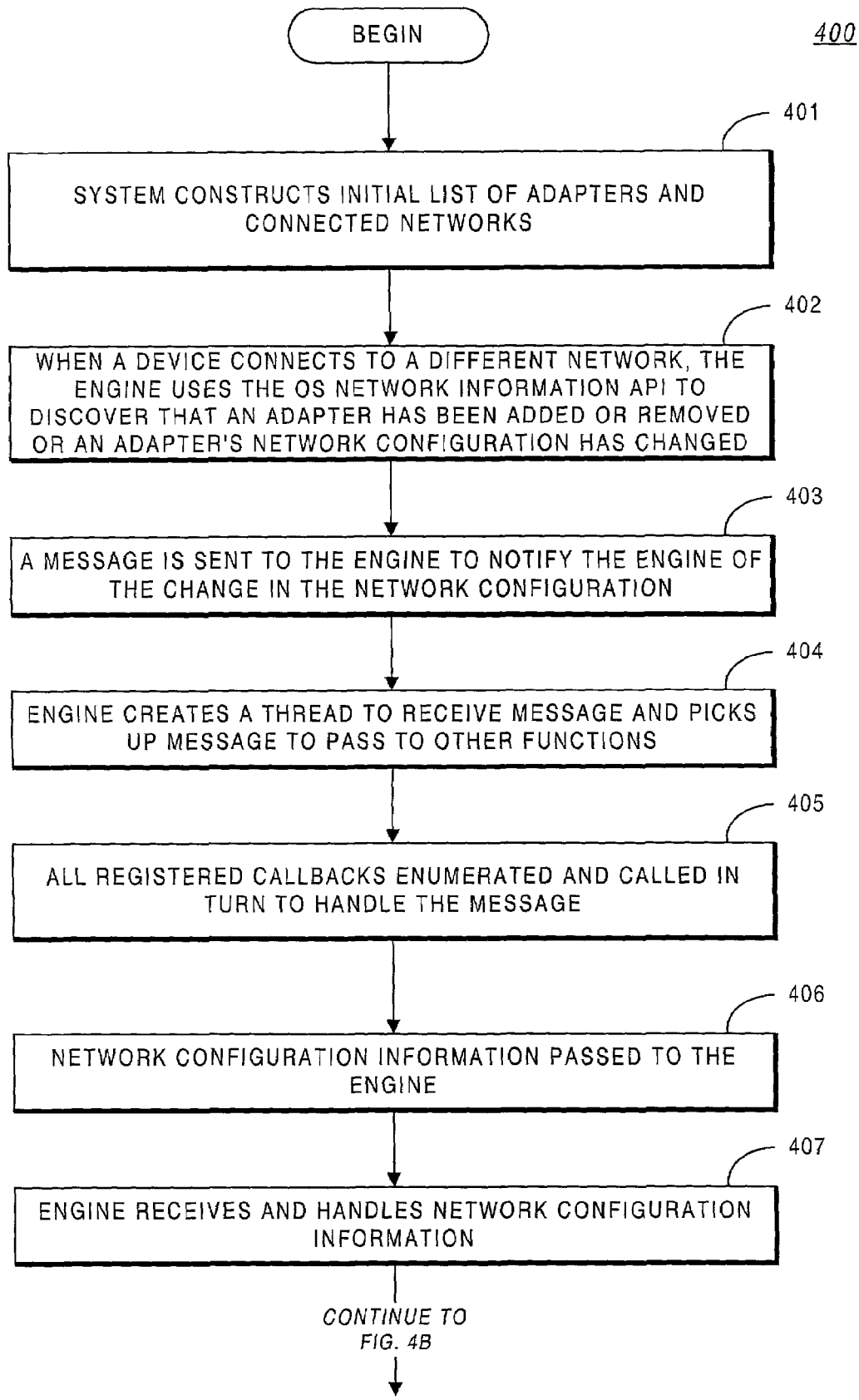
FIG. 4 illustrates a flow chart of the operations of the network detection and firewall reconfiguration system of the present invention.
Figure 4B:
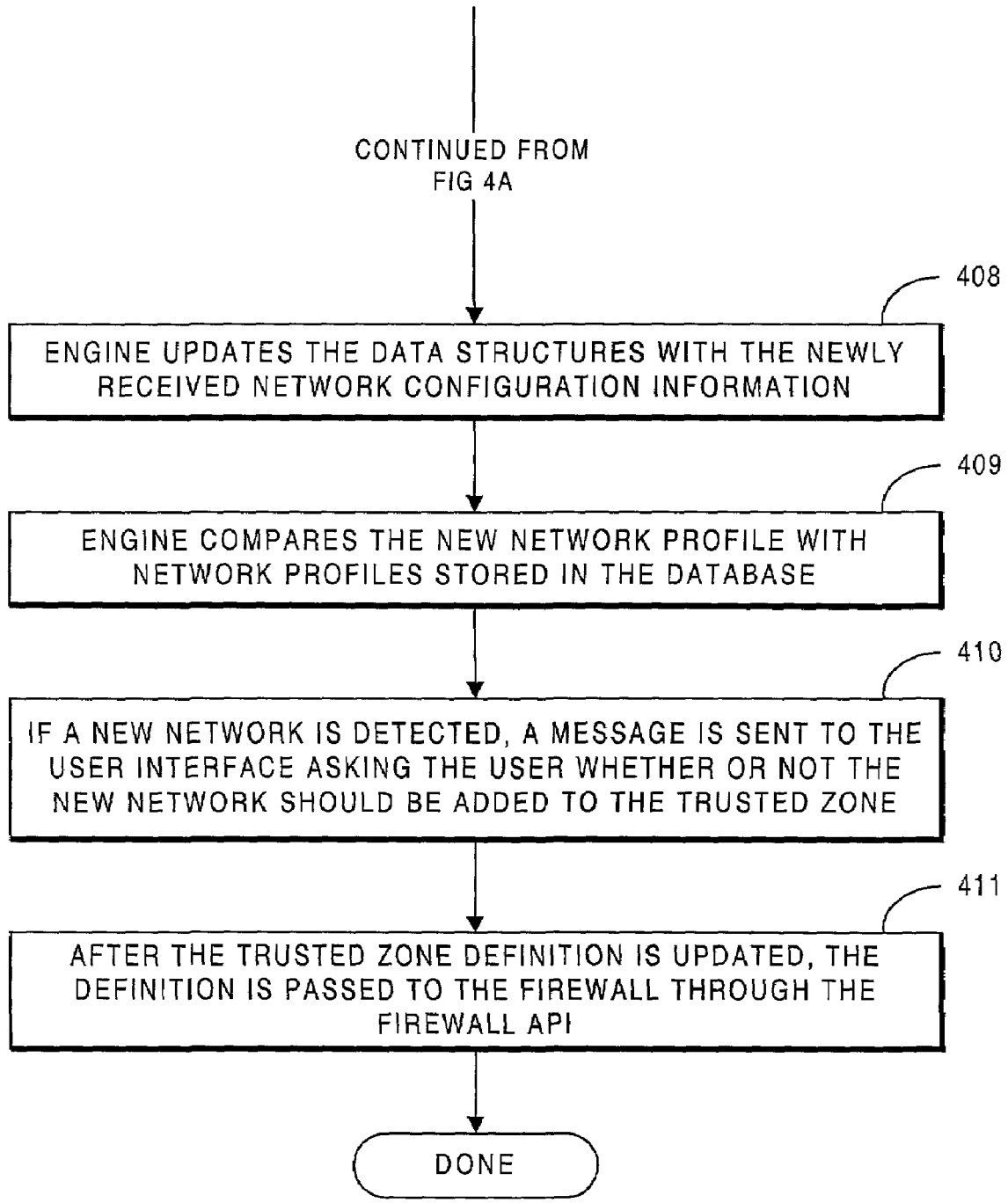

FIG. 4 is a flow chart illustrating detailed method steps of the operations of the network detection and firewall reconfiguration system of the present invention. Initially, the system starts with no knowledge of any connected networks or adapters. At step 401, the engine constructs an initial list of adapters and networks to which these adapters are connected by obtaining information through the OS network information API. When a mobile computer or device (on which the system is installed) is connected to a different network, the engine, at step 402, uses the OS network information API and the associated operating system kernel facility to discover that an adapter has been added or removed or an adapter's network configuration has changed.

At step 403, a message is sent to the engine to notify the engine of the change in the network configuration. In steps 404 through 407, the engine receives the message including new configuration information and passes this message on to the appropriate functions of the network detection and firewall reconfiguration system. At step 408, the engine updates the network information data structures with the newly received network configuration information. After the adapter has been recognized and the network has been profiled (i.e., information regarding the network obtained and stored), at step 409 the engine decides how to handle this new network. This is accomplished by comparing the current network with the list of network profiles stored in the database.

If a new network is detected, at step 410 a message is sent to the user interface to resolve the network detection event. A dialog box is displayed to the user asking the user whether or not the new network should be added to the local zone. Alternatively, the resolution of a network detection event can be determined by a policy previously established by the user or an administrator. For example, the system may be configured to treat all newly discovered networks as untrusted. After the list of networks is updated, at step 411 the list is automatically passed to the firewall through the firewall API. The firewall is updated to contain the newly defined trusted zone, which either includes or excludes the newly discovered network. The updated network information can also be consulted by other applications as described below.

E. Details of Internal Operations of Network Detection and Firewall Reconfiguration System The internal operations of the network detection and firewall reconfiguration system are described in more detail below, following the same method steps outlined in the flow chart attached as FIG. 4. Upon the initial connection of a mobile computer to a network, the system of the present invention (which is installed on such mobile computer) enumerates (in step 401) the adapter list from the appropriate operating system kernel facility. This allows the construction of an initial list of adapters and networks to which these adapters are connected. This adapter information is obtained through the OS network information API. When a mobile computer (on which the network detection engine is installed) is connected to a different network, at step 402, the engine uses the OS network information API and the same operating system facility to discover that the network configuration has changed.

In the currently preferred embodiment running in a Windows NT operating environment, notification of configuration changes is received from the Windows NT operating system by a filter hook that is installed on the Windows Transport Driver Interface (TDI) device's dispatch driver function. After this filter hook is installed, every invocation of the dispatch driver function will call the following filter handler function, TDIDeviceDispatch, to process the request.

```
 1:  NTSTATUS TDIDeviceDispatch(IN PDEVICE_OBJECT DeviceObject, IN PIRP Irp)
 2:  {
 3:     if (DeviceObject)
 4:        {
 5:        NTSTATUS Status = STATUS_SUCCESS;
 6:        PIO_STACK_LOCATION IrpSp = IoGetCurrentIrpStackLocation (Irp);
 7:        DWORD dwSocketID = GetSocketID (IrpSp);
 8:        PDEVICE_OBJECT HookedDevice = DeviceObject;
 9:
10:     ...
11:
12:        switch (IrpSp->MajorFunction)
13:           {
14:           case IRP_MJ_DEVICE_CONTROL:
15:              {
16:        ...
17:              switch
18:              (IrpSp->Parameters.DeviceIoControl.IoControlCode);
19:                 {
20:        ...
21:                 case IOCTL_TCP_SET_INFORMATION_EX:
22:                    {
23:                    DWORD *pdwBuffer =
24:                    Irp->AssociatedIrp.SystemBuffer;
25:                    DWORD dwLen =
26:        IrpSp->Parameters.DeviceIoControl.InputBufferLength;
27:
28:              // if a buffer was provided, and the buffer is the right size
```

```
29:             //
30:                     if ((dwLen >= sizeof(DWORD))&&
31:                         pdwBuffer && ((*pdwBuffer < 32)
32:                         || (*pdwBuffer == CL_NL_ENTITY)))
33:                     {
34:             // Copy the parameter data into a new buffer
35:                         CHAR cBuffer[sizeof(VSMSG) -
36:                             sizeof(VSMSG_CONFIG)];
37:
38:                         if (dwLen > sizeof(cBuffer))
39:                             dwLen = sizeof(cBuffer);
40:
41:                         memcpy(&cBuffer, pdwBuffer, dwLen);
42:             // pass the function call to the previous hook layer
43:             //
44:                         Status = TDIHookDeviceCall(HookedDevice, Irp,
45:                             IrpSp->MajorFunction);
46:
47:             // Call the TdiConfigChanged
48:             //
49:                         Status = TdiConfigChanged(dwSocketID, &cBuffer,
                                dwLen, Status);
50:                     ...
51:                         return Status;
52:                     }
53:                 }
54:             break;
55:                 }
56:             }
67:         }
68: ...
69:     }
70: ...
71: return STATUS_SUCCESS;
72: }
```

The above TDIDeviceDispatch function associates the request with an internal data structure used to track socket use, where relevant. The function checks to determine if the request is a request to change the network configuration. If the request is a request to change the network configuration, the function copies the parameter data and relays the request parameter data to the TdiConfigChanged function described below. The TDIDevice Dispath function also passes all requests to the original hooked driver function.

The "TdiConfigChanged" function is illustrated below.

```
1:  VSTDI.C:
2:  NTSTATUS __stdcall TdiConfigChanged(
3:      DWORD dwSocketID,
4:      PVOID pData,
5:      DWORD dwDataLen,
6:      NTSTATUS Status)
7:  {
8:      PVSMSG_CONFIG pMsg = NULL;
9:
10:     if (pData && dwDataLen)
11:     {
12:         pMsg =
13:             NewMessage(
14:                 pWSockHook,
15:                 sizeof(VSMSG_CONFIG),
16:                 GetCurrentProcessID( ),
17:                 GetCurrentThreadID( ),
18:                 dwSocketID,
19:                 0, NM_DONT_BLOCK);
20:
21:         if (pMsg)
22:         {
23:             pMsg->dwDataFlags |= DF_COPY_ALWAYS;
24:             pMsg->dwResult = Status;
25:
```

```
26:             PutMessage(
27:                 pWSockHook, &pMsg,
28:                 MCWSOCK_CONFIG_AFTER,
29:                 pData, dwDataLen, dwDataLen);
30:
31:             FreeMessage(pWSockHook, pMsg);
32:         }
33:     }
34:     return Status;
35:
```

The above "TdiConfigChanged" function is invoked by the above TDIDeviceDispatch function when a change in the network configuration is detected. In line 3, the above function passes a socket ID identifying a communication socket to be used to obtain information from the operating system. The socket ID that is specified varies depending upon the operating system on which the system is installed.

On line 10 above, "pData" and "dwDataLen" are buffers that point to a data structure. This data structure receives information from the operating system (through the above TDIDevice Dispatch function) describing the new configuration. The data structure contains a list of the adapters and a list of the new configuration for those adapters. The adapter information that is received from this operating system API call is referenced by the pData parameter.

On lines 10 through 19, if the data structure that is received contains something valid (i.e., it is not null), then "NewMessage" initializes a data structure and returns that data structure in "pMsg". The data structure is a message structure that communicates an event from the driver to the engine. If memory is allocated and the data structure is initialized (i.e., if pMsg is not null as shown on line 21), then "PutMessage" (on line 26) takes the pre-initialized data structure and fills more information into this structure, including pointers to data (pData and dwDataLen), and the type of event ("MCWSOCK_CONFIG_AFTER"). On line 27 above, "pWSockHook" is the internal data structure used to describe the client application using the driver. This data structure contains information such as the memory that has been allocated, a count of the number of clients, and other information about the client application.

The "Status" value on line 34 above is the value that the operating system returns when it has completed its own processing of the message. TdiConfigChanged is a post-filter function that filters the operating system API after the operating system processes the request for information. The Status value returned by the operating system advises whether or not the operating system may have already returned an error.

As shown in the above TdiConfigChanged function, a PutMessage function is invoked and at step 403 the message notifies the engine of the change in the configuration. The following code illustrates this engine process:

```
 1:  DWORD _stdcall PutMessage(
 2:  PHOOKREQUEST pHook,
 3:  LPVOID *ppMsg,
 4:  DWORD dwMsg,
 5:  LPVOID pData,
 6:  DWORD dwDataLen,
 7:  DWORD dwDataMax)
 8:  //
 9:  // allocates new message
10:  //
11:  //      pHook               client hook request structure
12:  //      pMsg                PVSMSG - pointer to message
13:  //      dwMsg               Message #
14:  //      pData               extra data
15:  //      dwDataLen           size of extra data
16:  //      dwDataMax           size of extra data buffer
17:  //
18:  // return                   value from client
19:  {
20:  PBASEVSMSG pVSMsg = *ppMsg;
21:  MAPDATA MData;
22:  PVOID pvDataMapped = NULL;
23:  DWORD dwMsgIndex;
24:
25:      if (dwDataMax < dwDataLen)
26:          dwDataMax = dwDataLen;
27:
28:  if (pData && dwDataMax)
29:  {
30:      pVSMsg->pDataOld = pData;
31:
32:      if ((pVSMsg->dwDataFlags & DF_DATA_MAPPED) ||
33:          ((!(pVSMsg->dwDataFlags & DF_COPY_ALWAYS)) &&
34:          (GlobalMemory (pData))))
35:  // Already mapped into global space
36:
37:      {
38:          pVSMsg->pData = pData;
39:      }
40:      else if (pHook->wAllocCount)
41:      {
42:          if ((sizeof(VSMSG) - pVSMsg->dwMsgSize) >= dwDataMax)
43:          {
44:              char* lpcCopy = ((char*)pVSMsg) + pVSMsg->dwMsgSize;
45:              memcpy (lpcCopy, pData, dwDataLen);
46:
47:          pVSMsg->dwDataFlags |= (DF_DATA_COPY | DF_DATA_COPY_TO_MSG);
48:          pVSMsg->dwDataFlags &= (~ (DF_DATA_FREE | DF_DATA_MAP_REQ));
49:
50:              // This is pointer to pData in application address space
51:
52:  pVSMsg->pData = (LPVOID)(lpcCopy - ((char*)pHook) +
53:  (pHook ->CurrentClient.dwHookRequest3));
54:          }
55:          else
56:          {
57:              if (pVSMsg->dwDataFlags & DF_COPY_ALWAYS )
58:              {
59:                  if (pVSMsg->pData = vsHeapAllocate((dwDataMax +
                        0x100) & 0xffffff00, 0))
60:                  {
61:                      memcpy(pVSMsg->pData, pData, dwDataLen);
62:                  pVSMsg->dwDataFlags |= (DF_DATA_COPY | DF_DATA_FREE);
```

```
63:              } //else
64:           }
65:        }
66:     }
67:     else
68:     {
69:         //We can ignore the data
70:         pVSMsg->dwDataFlags &= (~DF_DATA_MAP_REQ);
71:     }
72: }
73:
74: pVSMsg->dwDataLen = dwDataLen;
75: pVSMsg->dwDataMax = dwDataMax;
76: pVSMsg->dwMsg = dwMsg;
77:
78:     // Add the Message to the MessageQueue.
79: dwMsgIndex = InterlockedIncrement (&pHook->dwMsgHead) - 1;
80:
81: pHook->MsgList[(dwMsgIndex) % (pHook->dwMsgCnt)] =
82:     (WORD)((((DWORD)pVSMsg) - ((DWORD)(&(pHook->FirstMsg)))) /
        sizeof(VSMSG));
83:
84:
85: if (!bShutdown)       //if (pVSMsg->dwMsgFlags & MFM_URGENT)
86:     {
87:     // We'll just wake up the ring 3 thread but continue because we
        don't care
88:         // if the message has yet been processed
89:         DriverNotify(pHook);
90:     }
91:     return pVSMsg->dwResult;
92: }
93:
94: VSUTILNT.CPP:
95: VOID DriverNotify(PHOOKREQUEST pHook)
96: {
97:     if (pHook->CurrentClient.pSyncEvent)
98:     {
99:     KeSetEvent((PKEVENT)(pHook->CurrentClient.pSyncEvent), 0, FALSE);
100:    }
101: }
102:
```

As shown above, a device driver passes the message to the engine process ("VSMON.EXE") through its message queue (this is a shared memory segment previously allocated). When the message is inserted into the queue, the device driver signals the engine process to handle the message. On line 25 the condition "if (dwDataMax<dwDataLen)" is error checking code. The condition on lines 32–35 looks to see if there is data. If there is no data, then there is no need to handle the message. Otherwise, if the message contains data, on lines 47 and 48 flags may be set to govern how the data is copied and what kind of mechanism is used to allocate the extended data that was received. This is an optimization to make the data available to higher layer functions based on these flags and to mark what was done so that it can be undone when the message has been processed. The segment of the code on lines 50 through 72 handles copying data into an accessible buffer.

The code on lines 79 through 84 inserts the message into the message queue. The "DriverNotify" function at lines 89 through 101 issues the actual signal that the device driver sends to the engine process to handle the message. This DriverNotify function is a call to kernel set event ("KeSetEvent"), which is a kernel system call on the Windows NT operating system signaling that a message has been inserted into the message queue.

In steps 404 through 407, the engine receives the message regarding new configuration information and passes this message on to the appropriate functions of the network detection and firewall reconfiguration system. In step 404, the engine creates a thread to receive messages and the below "DataThread" function picks up messages and distributes them to other functions as described below.

```
1: VSDATA.CPP:
2: // This is the main thread that picks up messages and distributes them
   to the clients
3: UINT WINAPI DataThread(LPVOID lpVoid)
4: {
5:     PDATACLIENT pDC = (PDATACLIENT) lpVoid;
6:     PHOOKREQUEST pHook = pDC->pData;
```

-continued

```
 7:    DWORD dwThreadID3 = GetCurrentThreadId( );
 8:    DWORD dwMsgCount;
 9:
10:    pHook->RequestClient.dwClass = pDC->dwClass;
11:    pHook->RequestClient.dwProcessID3 = GetCurrentProcessId( );
12:    pHook->RequestClient.dwThreadID3 = dwThreadID3;
13:    pHook->RequestClient.dwHookRequest3 = (DWORD)pHook;
14:
15:    pDC->hSyncEvent3 = CreateEvent (NULL, 0, 0, NULL);
16:    pHook->RequestClient.hSyncEvent3 = pDC->hSyncEvent3;
17:    pHook->RequestClient.hSyncEvent = OpenDriverEventHandle(pDC-
       >hSyncEvent3);
18:
19:    pDC->hDrvSyncEvent3 = CreateEvent(GetSecurityAttributes( ), TRUE, 0,
       VSDRVEVENTNAME);
20:    if (!(pHook->hDrvSyncEvent))
21:    {
22:    pHook->hDrvSyncEvent = OpenDriverEventHandle(pDC->hDrvSyncEvent3);
23:        pHook->hDrvSyncEvent3 = pDC->hDrvSyncEvent3;
24:    }
25:
26:    pDC->hDriver = OpenHookDriver(pHook);
27:
28:    // This SetEvent informs the main AddDataClient code below that
29:    // the DataThread initialization is complete. Initialization is NOT
30:    // complete if the driver can't load or if the important events are
31:    // not available.
32:
33:    if ((pDC->hDriver) && (pDC->hSyncEvent3) && (pDC->hDrvSyncEvent3) &&
       (pDC->hStartupEvent))
34:    {
35:        SetEvent(pDC->hStartupEvent);
36:    }
37:
38:    pHook->dwReady++;
39:
40:    pDataClient = pDC;
41:
42:    while (pDC->bDataThread)
43:    {
44:        BOOL bSync = FALSE;
45:
46:        if ((pHook->CurrentClient.dwThreadID3) == dwThreadID3)
47:        {
48:            if (dwMsgCount)
49:            {
50:                SendDataClients (
51:                    &pHook->pMsgList[0],
52:                    dwMsgCount,
53:                    DwThreadID3,
54:                    pHook,
55:                    FALSE);
56:
57:                bSync = TRUE;
58:            }
59:        }
60:
61:        if (bSync && (pDC->hDrvSyncEvent3))
62:        {
63:            BOOL bRes;
64:            if (IsWinNT( ))
65:                bRes = SetEvent(pDC->hDrvSyncEvent3);
66:            else
67:                bRes = PulseEvent(pDC->hDrvSyncEvent3);
68:        }
69:        WaitForSingleObject(pDC->hSyncEvent3, 2500);
70:    }
71:    ...
72:    return (0);
73: }
```

Of particular interest on line 69 is the "WaitForSingleObject" which awakens this thread when the kernel set event (KeSetEvent) is called by the previously-described DriverNotify function. The DriverNotify function wakes up this client thread and lets it know that there are messages in the message queue. This DataThread function picks up these messages from the shared memory segment, and (on line 50 above) calls the SendDataClients function to distribute the messages to each registered callback function.

All of the code in this DataThread function (prior to line 69) is a thread that is created and initialized prior to the kernel set event. As part of this initialization sequence, on lines 5 through 36, the "pHook" data structure is initialized and the events that the function is handling are created. On line 22, "OpenDriverEventHandle" is a call to the engine driver to tell the engine about a particular event. "OpenHookDriver" on line 26 is a call to the engine driver that points to the initialized pHook data structure.

The portion of the DataThread function following line 26 is essentially a message loop. As shown on line 42, the message loop ("while (pDC->bDataThread)") continues while there are messages pending. If messages are pending, the DriverNotify function calls the function named "SendDataClients," passing a pointer to the beginning of the list of messages and the number of messages pending.

At step 405,the following SendDataClients function enumerates all the registered callbacks, and calls the registered callbacks in turn to allow each of the registered callbacks to handle the message.

```
1: VSDATA.CPP:
2: VOID VSAPI SendDataClients(
3:     PVSMSG *ppMsg,
4:     DWORD dwMsgCount,
5:     DWORD dwDataThreadID,
6:     PHOOKREQUEST pHook,
7:     BOOL bResubmit)
8: {
9:     DWORD i, n;
10:
11:    for (n = 0; n < MAXDATACLIENTS; n++)
12:    {
13:        if ((DataClient[n].pCallback) &&
14:            (DataClient[n].dwDataThreadID == dwDataThreadID))
15:        {
16:            DataClient[n].pCallback(ppMsg, dwMsgCount);
17:        }
18:    }
19:
20:    for (i = 0; i < dwMsgCount; i++)
21:    {
22:        PVSMSG pMsg = ppMsg[i];
23:
24:        pMsg->dwMsg = 0;
25:        pMsg->dwMsgFlags = MFR_PROCESSED;
26:
27:        pHook->FreeMsgList[(pHook->dwMsgFreeHead) % (pHook->dwMsgCnt)] =
28:            (WORD)((((DWORD) pMsg) - ((DWORD)(&(pHook->FirstMsg)))) / sizeof(VSMSG));
29:        pHook->dwMsgFreeHead++;
30:    }
31: }
```

The above SendDataClients function loops through a list of message clients (data clients), and calls each one of them passing along the pointer to a list of messages and count of the number of pending messages. This is an internal dispatch mechanism to dispatch messages to various clients which is analogous to the Windows dispatch mechanism. After all of the messages have been dispatched, the function loops through all the messages and marks them as processed (lines 20–28) so that they can be deleted.

One registered callback (a client that is called by the above SendDataClients function) is the engine message handler. At step 406,network configuration messages (which are of the message class "MC_WSOCK"), are passed to the "WsockHandleMsg" function as illustrated below.

```
1: VSMON.CPP:
2: DWORD VSAPI MonitorDataCallback(
3:     PVSMSG *ppMsg,          // Pointer to message array
4:     DWORD dwMsgCount)       // Number of message in array
5: {
6:     DWORD n;
7:
8:     for (n = 0; n < dwMsgCount; n++)
9:     {
10:        PVSMSG pMsg;
11:
12:        if ((!bShutdown) && (pMsg = ppMsg[n]))
13:        {
14:            switch (pMsg->dwMsg & MC_MASKALL)
15:            {
16:        ...
17:            case MC_WSOCK:
18:                WSockHandleMsg((PVSMSG_STREAM)pMsg);
19:                break;
20:
21:            }
22:        }
```

-continued

```
23:    }
24:    return 0;
25: }
```

The MonitorDataCallback function calls a different handler function depending on the class of message that is received. In particular, this function identifies all the messages that are of the message class MC_WSOCK and calls WSockHandleMsg to handle all of those messages.

At step 407, the engine receives the above network configuration messages (which are of the message class "MC_WSOCK"), and the following WSockHandleMsg function handles them by distributing these messages to the relevant code elements:

```
1:  VSSOCK.CPP:
2:  VOID WSockHandleMsg(PVSMSG_STREAM pMsgStream)
3:  {
4:  ...
5:      switch(pMsgStream->dwMsg & MCWSOCK_MASKMSG)
6:      {
7:  ...
8:          case MCWSOCK_CONFIG_AFTER:
9:          {
10:             PVSMSG_CONFIG pMsgConfig = (PVSMSG_CONFIG)pMsgStream;
11:             if ((pMsgConfig->pData) &&
12:                 (pMsgConfig->dwDataLen >= sizeof(DWORD)))
13:             {
14:                 if (!bShutdown)
15:                 {
16:                     if (bInitAdapters)
17:                     {
18:                         // something else changed; re-init
19:                         bSyncAdapters = TRUE;
20:                     }
21:                     else if (bWaitAdapters)
22:                     {
23:                         // already waiting to init adapters
24:                     }
25:                     else if (IsWinNT( )&& pMsgStream->dwHandleID)
26: // dwHandleID == 0 means it's us: wait a bit
27:                         DoInitAdapters(TRUE);
28:                     else
29:                     {
30:                         DWORD dwThreadID;
31:                         CreateThread(
32: NULL,
33: 0x4000,
34: InitAdaptersThread,
35: NULL,
36: 0,
37: &dwThreadID);
38:                     }
39:                 }
40:             }
41:         }
42:         break;
43:  ...
44:     }
45: }
46: }
```

The above WSockHandleMsg function takes the message parameters which are packaged into an object called "PVSMSG_STREAM" and (on line 10) casts them to "PVSMSG_CONFIG." On line 11, if the message contains data (i.e., is not null), and if the system is not currently initializing elsewhere ("bInitAdapters" or "bWaitAdapters"), the function attempts to process the configuration change message. Of particular interest are the call to "DoInitAdapters" and the "CreateThread" portions of the above function on lines 25 through 40. On line 25, the DoInitAdapters function is called directly if there is a valid handle and the operating system is Windows NT. Otherwise, on lines 28 through 37, a thread is created which will wait for a period of time and then call the DoInitAdapters function.

In either event, the operations of the DoInitAdapters function, when invoked, are described below.

At step 408, the engine updates the network information data structures with the newly received network configuration information. For each adapter, the system uses the OS network API to discover the adapter and the networks to which the adapter is connected. This information is used to build the network and adapter configuration information regarding such networks. The engine handles each message by altering internal data structures to match the newly received network configuration information as illustrated below:

```
1:   VSSOCK.CPP
2:   DWORD WINAPI InitAdaptersThread(LPVOID 1pV)
3:   {        bWaitAdapters = TRUE;
4:        Sleep(100);
5:        DoInitAdapters(TRUE);
6:        return 0;
7:   }
8:
9:   VSCOMP.CPP:
10:  VOID WINAPI DoInitAdapters(BOOL bFWUpdate)
11:  {        bWaitAdapters = FALSE;
12:       if (bInit Adapters)
13:            bSyncAdapters = TRUE;
14:       else
15:       {
16:            PVR_COMPUTER pCurComputer = OpenCurrentComputer( );
17:            if (pCurComputer)
18:                 pCurComputer->InitAdapters(bFWUpdate);
19:       }
20:  }
21:
22:  VSCOMP.CPP:
23:  VOID VR_COMPUTER::InitAdapters(BOOL bFWUpdate)
24:  {        if (bInitAdapters)
25:       {
26:            return;
27:       }
28:
29:       bInitAdapters = TRUE;
30:       bSyncAdapters = TRUE;
31:
32:       DWORD i;
33:       DWORD dwAdapterFlags;
34:       BOOL bChanged;
35:       DWORD dwNetRes;
36:       PVR_ADAPTER pAdapter;
37:
38:       while (bSyncAdapters)
39:       {    bChanged = FALSE;
40:            dwNetRes = 0;
41:            while (bSyncAdapters)
42:            { bSyncAdapters = FALSE;
43:                 if (bShutdown)
44:                 {    bInitAdapters = FALSE;
45:                      return;
46:                 }
47:
48:            // set adapters' update flag (it gets cleared in SetAdapterInfo)
49:                 pAdapter = pAdapterList;
50:                 while (pAdapter)
51:                 {   pAdapter->dwAdapterFlags |= ADAPTER_INFO_UPDATE;
52:                     pAdapter = (PVR_ADAPTER) pAdapter->pNext;
53:                 }
54:
55:            // get tdi info
56:                 DWORD dwCount;
57:                 IP_ADAPTER IpAdapter[32];
58:                 if (GetIpAdapterInfo(IpAdapter, 32, &dwCount))
59:                 { if (dwCount > 32)
60:                      dwCount =32;
61:
```

```
 62:            for (i = 0; i < dwCount; i++)
 63:            {dwAdapterFlags = PrepAdapter (&IpAdapter[i]);
 64:                if (dwAdapterFlags == 0xffffffff)
 65:                    continue;
 66:
 67:                if ((pAdapter = FindAdapter(&IpAdapter[i])))
 68:                {
 69:                    if (pAdapter->SetAdapterInfo (&IpAdapter [i],
                            AdapterFlags))
 70:                        bChanged = TRUE;
 71:                }
 72:            else if ((pAdapter = new VR_ADAPTER(&pAdapterList,
                    &IpAdapter[i], dwAdapterFlags)))
 73:                {       dwAdapterCount++;
 74:                    bChanged = TRUE;
 75:                }
 76:
 77:                if (pAdapter)
 78:                {dwNetRes |= pAdapter AddNetworks(this);
 79:                }
 80:            }
 81:        }
 82:
 83:        // delete adapters which haven't been updated (& see if their
            networks need deleting)
 84:            PVR_ADAPTER pDelAdapter;
 85:            pAdapter = pAdapterList;
 86:            while (pAdapter)
 87:            {   pDelAdapter = pAdapter;
 88:                pAdapter = (PVR_ADAPTER) pAdapter->pNext;
 89:                if (pDelAdapter->dwAdapterFlags & ADAPTER_INFO_UPDATE)
 90:                {       if (pDelAdapter->DelNetworks(this))
 91:                    dwNetRes |= ADAPTER_NETWORK_DELETED;
 92:                        pDelAdapter->DestroyObject( );
 93:                        DwAdapterCount--;
 94:                        bChanged = TRUE;
 95:                }
 96:            }
 97:
 98:        } // while (bSyncAdapters): inner
 99:
100:        if (bChanged || dwNetRes)
101:        {   if (bShutdown)
102:            {   bInitAdapters = FALSE;
103:                bSyncAdapters = FALSE;
104:                return;
105:            }
106:    ...
107:            pAdapter = pAdapterList;
108:            this->dwIPAddr = 0;
109:            while (pAdapter)
110:            {
111:                for (i = 0; i < pAdapter->dwIpCount; i++)
112:                {   if (pAdapter->IpInfo[i].dwAddr != 0)
113:                    {
114:                        this->dwIPAddr = pAdapter->IpInfo[i].dwAddr;
115:                        break;
116:                    }
117:                }
118:                if (i >= pAdapter->dwIpCount)
119:                    pAdapter = (PVR_ADAPTER) pAdapter->pNext;
120:                else
121:                    break;
122:            }   //dwIpAddr setting end
123:            if (bChanged)
124:                LZUpdateAdaptersEx((HCONTEXT)hLocalContext);
125:            if (dwNetRes)
126:                LZUpdateNetworksEx((HCONTEXT)hLocalContext);
127:            if (bFWUpdate && (dwGlobalSSFlags & SSF_LLD_FIREWALL))
128:                FirewallUpdateLANGroup( );
129:        } // if (bChanged || dwNetRes)
130:    } // while (bSyncAdapters): outer
131:    bInitAdapters = FALSE;
132: }
133:
134: VSADAPTER.CPP:
135: DWORD VR_ADAPTER::AddNetworks(PVR_COMPUTER pComputer)
136: {       DWORD j;
137:    DWORD dwRes = 0;
```

-continued

```
138:    PVR_NETWORK pNetwork;
139:    IP_NETWORK IPNetwork = {0};
140:    PVR_NETWORK NewNetworks[MAX_IP_ADDR] = {0};
141:
142:    // decrement network ref counts; if still used, they will be
        incremented back
143:    for (j = 0; j < MAX_IP_ADDR; j++)
144:    {    pNetwork = Networks[j];
145:        if (pNetwork && pNetwork->dwRef Count)
146:            pNetwork->dwRef Count--;
147:    }
148:
149:    // add networks
150:    for (j = 0; j < dwIpCount; j++)
151:    {    memset (&IPNetwork, 0, sizeof(IPNetwork));
152:        IPNetwork.dwNetAddr = IpInfo[j].dwAddr & IpInfo[j].dwMask;
153:        if (!(IPNetwork.dwNetAddr))
154:            continue;        //break;        //?
155:
156:        IPNetwork.dwNetFlags = NWF_NET_ADDR;
157:        IPNetwork.dwNetMask = IpInfo[j].dwMask;
158:        if (dwAdapterFlags & ADAPTER_INFO_DIALUP)
159:        {    memcpy(& (IPNetwork.GWPhysAddr), &PhysAddr,
            size of (IPNetwork.GWPhysAddr));
160:            IPNetwork.dwNetFlags = NWF_PHYS_ADDR;
161:            // try to get connection info
162:            if (GetRASConnectionName(IpInfo[j].dwAddr,
                IPNetwork.cName, sizeof(IPNetwork.cName)))
163:            {        IPNetwork.dwNetFlags = NWF_CONN_NAME;
164:            }
165:        }
166:        else if (IS_PRIVIP(IpInfo[j].dwAddr))
167:        {if (IpInfo[j].dwGateway && (IpInfo[j].dwGateway !=
            IpInfo[j].dwAddr))
168:        GetGatewayPhysAddr(IpInfo[j].dwGateway, IPNetwork.GWPhysAddr);
169:            else
170:                memcpy (&(IPNetwork.GWPhysAddr), &PhysAddr,
                    sizeof(IPNetwork.GWPhysAddr));
171:            IPNetwork.dwNetFlags |= NWF_PHYS_ADDR;
172:        }
173:        if ((pNetwork = FindNetwork(&IPNetwork)))
174:        {    if (pNetwork->SetNetworkInfo(&IPNetwork))
175:                dwRes |= ADAPTER_NETWORK_CHANGED;
176:            pNetwork->dwRef Count++;
177:        }
178:        else if ((pNetwork = new VR_NETWORK(&(pComputer-
            >pNetworkList), &IPNetwork)))
179:        {    dwRes |= ADAPTER_NETWORK_ADDED;
180:            pNetwork->dwRef Count = 1;
181:            if (bCMPEnabled)
182:            {    dwRes |= ADAPTER_CHECK_CMP;
183:                pNetwork->bCheckCMP = TRUE;
184:            }
185:            pComputer->dwNetCount++;
186:        }
187:        NewNetworks[j] = pNetwork;
188:    }
189:    // delete unused networks
190:    for (j = 0; j < MAX_IP_ADDR; j++)
191:    {    pNetwork = Networks [j];
192:        if (pNetwork && !(pNetwork->dwRef Count))
193:        {    dwRes |= ADAPTER_NETWORK_DELETED;
194:            if (pComputer->dwNetCount)
195:                pComputer->dwNetCount--;
196:            if (pComputer->dwNetCountLAN && pNetwork->dwNWStatus)
197:                pComputer->dwNetCountLAN--;
198:            pNetwork->DestroyObject( );
199:            Networks[j] = NULL;
200:        }
201:        Networks [j] = NewNetworks[j];
202:    }
203:    return dwRes;
204: }
```

The above DoInitAdapters function includes an object named "VR_Computer" as shown on line 23. The VR_Computer object contains a list of adapters and a list of networks. Of particular interest is the invocation of the "GetIpAdapterInfo" function as shown on line 58 above. GetIPAdapterInfo updates the list of adapters and fills in an array of IP adapter data structures to provide information about how particular adapters are configured. In the currently preferred embodiment, the IP adapter data structure may be constructed as follows:

```
 1: #define MAX_IP_ADDR           4               // max. ip addresses
 2:   per adapter
 3: #define MAX_IP_DESC_LEN       128
 4: #define MAX_IP_NAME_LEN       128
 5:
 6: // IP address info
 7: typedef struct _IP_INFO {
 8:     DWORD dwAddr;              // ip address
 9:     DWORD dwMask;              // subnet mask
10:     DWORD dwGateway;           // default gateway ip address
11:     DWORD dwFlags;             // flags
12: } IP_INFO, *PIP_INFO;
13:
14: // Adapter info
15: typedef struct _IP_ADAPTER {
16:     CHAR          cDesc[MAX_IP_DESC_LEN];    // description
17:     CHAR          cName [MAX_IP_NAME_LEN];   // name
18:     DWORD         dwIndex;                   //adapter index
19:     DWORD         dwFWId;                    //firewall adapter id?
20:     DWORD         dwIFType;     //adapter type; see MIB_IF_TYPE_*
21:     DWORD         dwIpCount;               //ip address count
22:     IP_INFO       IpInfo[MAX_IP_ADDR];     // ip addresses, etc.
23:     PHYS_ADDR     PhysAddr;                  //physical address
24: } IP_ADAPTER,    *PIP_ADAPTER;
25:
```

As shown above, the IP Adapter data structure contains information about how a particular adapter is configured. For example, the IP address, the subnet mask, and the default gateway IP address for the adapter are indicated on lines 8–10 of this data structure.

After the IP data structure array has been filled in, the above DoInitAdapters function commences at line 62 to update the VR_Computer object with the adapter information in the array. A call is made to the function named "PrepAdapter" on line 63 that returns certain adapter flags used in processing adapter information in the array. Next, a call is made to "FindAdapter" on line 67. The FindAdapter function goes through the existing list of adapters and determines if a particular adapter is already in the list of adapters. If an adapter is already in the list, then it calls "SetAdapterInfo" (as shown on line 69) to change the parameters associated with that adapter (i.e., it updates the information relating to that specific adapter object). Otherwise, if an adapter is not found in the existing list, then a new adapter object is created (as shown on line 72) and added into the VR_Computer object list of adapters.

On line 78 above, a call is made to the function named "AddNetworks" for each adapter. The AddNetworks function examines the network list for each adapter to make sure that all the networks addressed by the adapter are listed in the network list maintained by the VR_Computer object. The AddNetworks function that is invoked is on lines 135 to 204. Because any given adapter can be connected to multiple networks, the AddNetworks function obtains information about each of these networks from the adapter information data structure and attempts to identify the network. If a network is identified, the list of network objects is updated. Of particular interest is the code for identifying networks on lines 156 to 172. If, for example, a particular adapter is a dialup adapter, then the name (RAS Connection name) of this adapter is obtained and is used as the identifier for the dialup adapter. However, if this particular adapter is not a not a dialup adapter (i.e., if the adapter is connected to some other type of network) then the gateway physical address is used to identify the adapter. The result is that this AddNetworks function obtains the name (or an alternate identifier) for the network and information about the characteristics of the network (whether it is dialup, Ethernet, etc.). The next step (from lines 173 to 187) is to make sure that each of these networks is either already in the list of networks or, alternatively, that such network is added to this list of networks if it is new. The last portion of the AddNetworks function (from line 189 to the end) deletes all the unused networks (i.e., networks not added or changed).

After all of the adapters have been recognized and network information has been obtained (the end of the while loop on line 98 above), the DoInitAdapters function commences post processing with respect to those adapters that have been updated (added or modified). Of particular interest is the code on lines 123 to 130 which updates internal data structures with the new adapter and network information. The internal data structures that are updated are the "local" (or trusted) zone and the firewall LAN group.

After the adapter has been recognized and the network has been profiled (i.e., information regarding network obtained and stored), at step 409 the engine decides how to handle this new network. This is accomplished by comparing this network with the list of network profiles stored in the database. A string comparison of the network profiles is made. (The string comparison methodology is described in more detail below). As new items are added, these items are evaluated and added to the security settings according to the current rule settings which typically are: (a) always add the item; (b) never add the item; or (c) ask the user. The function that evaluates each network is illustrated below.

```
1: ZoneDB.CPP:
2: DWORD WINAPI NetworkQueryCallback(PQUERY pQuery,
3:                                   DWORD dwEvent,
4:                                   DWORD dwObjectID,
5:                                   DWORD dwObjectType)
6: { if (dwEvent != QEVT_ENUM)
7:         return 0;
8:
9:     if (!MonitorGetDWordValue(dwObjectID, GDV_IPADDR))
10:        return 0;
11:
12:    CHAR cID[MAX_ZCID];
13:    if (!MonitorGetCharValue(dwObjectID, GCV_NETWORKID, cID,
       sizeof(cID)))
14:        return 0;
15:
16:    DWORD dwStatus;
17:    TLocalZone *pLZone = (TLocalZone *) pQuery->pClient;
18:    PZONE_NETWORK pZNetwork = pQuery->dwClient ? NULL : pLZone-
       >LZFindNetworkByCID(cID);
19:    if (pZNetwork)
20:    {     pZNetwork->dwNetworkObj = dwObjectID;
21:          dwStatus = pZNetwork->dwStatus;
22:    }
23:    else
24:    {     CHAR cDesc[MAX_ZDESC] = {0};
25:          if (!(MonitorGetCharValue(dwObjectID, GCV_CONN_NAME, cDesc,
              sizeof(cDesc)) && cDesc[0]))
26:              LoadString(hResInst, IDS_NEW_NETWORK, cDesc, sizeof(cDesc));
27:          dwStatus = pLZone->dwDefNetworkStatus;
28:          if ((pZNetwork = new ZONE_NETWORK(dwObjectID, cID, cDesc,
              dwStatus)))
29:          {    RegisterStoredObject(pZNetwork);
30:               pZNetwork->AddRef( );
31:               pLZone->Networks.push_back(pZNetwork);
32:          }
33:          pLZone->hNetworkList = NULL;
34:    }
35:    if (dwStatus == NWS_ASK)
36:    {
37:        DWORD dwRes = RulesClientCallback(MSGEVT_CLIENT_NETWORK_DETECTED, 0,
           RDBOBJID(pZNetwork), 0, NULL);
38:        if (dwRes != MSGEVT_RETURN_NOOP)
39:        {dwStatus = MSGEVT_CONTINUE(dwRes) ? NWS_INCLUDE :
           NWS_EXCLUDE;
40:            pZNetwork->SetPropDWord(PROPID_STATUS, dwStatus);
41:            pLZone->hNetworkList = NULL;        // force update
42:        }
43:    }
44:    MonitorSetDWordValue (dwObjectID, GDV_STATUSCODE, (dwStatus ==
       NWS_INCLUDE) ? 1 : 0);
45:    return 0;
46: }
```

The above NetworkQueryCallback function evaluates if the network being enumerated is new. If it is new, then a matching rule entry is made in the database (the new "ZONE_NETWORK"). If the default behavior is to ask the user whether or not to include the network in the local zone, then the above function calls the below "RulesClientCallback" ("MSGEVT_CLIENT_NETWORK_DETECTED") function. Otherwise, if the default behavior is to either include the network in the local zone or exclude the network from the local zone, this default status is immediately stored and applied.

If the default behavior is to ask the user whether or not to include the newly detected network in the local (trusted) zone, at step 410 a message is sent to the user interface to resolve the network detection event. A dialog box is displayed to the user asking him or her whether or not the new network should be added to the local zone. The result is stored as the network object's status code in the database (as indicated in step 409 above).

```
1: Logins.cpp
2: DWORD WINAPI RulesClientCallback( UINT idFunc, DWORD dwProcId, DWORD
   dwObjId, LPVOID pBuf, UINT cbBufSize )
3: {
```

```
 4:    return MonitorNotifyEvent( idFunc, dwProcId, dwObjId, 0, pBuf,
       cbBufSize );
 5: }
 6:
 7: VSCLIENT.CPP:
 8: DWORD WINAPI MonitorNotifyEvent(// Notifies event handlers of events
 9:        DWORD dwEventMsg,            // Event message #
10:        DWORD dwProcessId,           // ID of the originating process
11:        DWORD dwId,                  // ID of the originating object
12:        DWORD dwAnchor,              // Used by external handler
13:        LPVOID pData,                // Additional data (based on message)
14:        DWORD dwDataLen)             // Lengths (of additional data)
15: {
16:        DWORD dwResult = 0;
17:        DWORD dwResultNext;
18:        PVR_CLIENT pClient = pClientList;
19:
20:        while (pClient)
21:        { dwResultNext = pClient->NotifyEvent (dwEventMsg, dwProcessId, dwId,
22:                                       dwAnchor, pData, dwDataLen);
23:            if (dwResultNext > dwResult)
24:                dwResult = dwResultNext;
25:
26:            pClient = (PVR_CLIENT)(pClient->pNext);
27:        }
28:        return (dwResult);
29: }
```

The above RulesClientCallback function passes a notification of the network detection event to the client user interface. If the user interface cannot be reached, the above function returns a status of "MSGEVT_RETURN_NOOP" and the default result is used. If the user interface is reached, a pop-up window is displayed to the user asking whether or not the new network should be added to his or her trusted (local) zone.

After the list of networks is updated, at step 411 this updated list is passed back to the firewall through the firewall API using the "FirewallUpdateLANGroup" function shown below. The firewall is updated to contain the newly defined trusted (or local) zone, which either includes or excludes the newly discovered network.

```
 1:   VSFWCTRL.CPP:
 2:   BOOL WINAPI FirewallUpdateLANGroup(VOID)
 3:   {      return FirewallUpdateGroup(FWG_LAN, 0);
 4:   }
 5:
 6:   This enumerates the contents of the LAN group and then calls
       FirewallUpdateGroup:
 7:
 8:   BOOL WINAPI FirewallUpdateGroup(HANDLE hGroup, DWORD dwZoneId)
 9:   {
10:        if (!(dwGlobalSSFlags & SSF_LLD_FIREWALL))
11:            return FALSE;
12:
13:        // delete current group; get LAN ip count
14:        DWORD dwIPCount = 0;
15:        BOOL bLAN = (hGroup == FWG_LAN);
16:        BOOL bRZone = (hGroup == FWG_RESTRICTED);
17:
18:        if (bLAN)
19:        {     if (dwFWLZFlags & FWLZ_NETWORKS)
20:                  dwIPCount += GetNetworkCount (TRUE);
21:            if (dwFWLZFlags & FWLZ_ADAPTERS)
22:                  dwIPCount += GetIPCount (AL_LAN);
23:            FirewallClearRule(&hLANGroup);
24:        }
25:        ...
26:        // get ip set size info
27:        UGSINFO Info = {0};
28:        RULEQUERY query;
29:        ZeroMemory(&query, sizeof(query));
30:        query.cbSize = sizeof(query);
31:        query.dwObjType = OBJTYPE_IPSET;
32:        query.hQuery = (HANDLE) &query;
33:        query.dwCookie = (DWORD) &Info;
34:        query.callback = UGSizeInfoCallback;
```

-continued

```
35:     if (bLAN)
36:         LZEnumContentsEx((HCONTEXT) hLocalContext, &query);
37:     else if (bRZone)
38:         RZEnumContentsEx((HCONTEXT) hLocalContext, &query);
39:     else
40:         EnumZoneMembersEx((HCONTEXT) hLocalContext, &query, dwZoneId);
41:
42:     HANDLE hNewGroup = NULL;
43:
44:     // group is empty
45:     if (!(dwIPCount || Info.dwCount))
46:     {   if (bRZone)
47:         {   if (hBlockRZone)
48:                 FirewallSetRuleEnable(hBlockRZone, FALSE);
49:             return FALSE;
50:         }
51:
52:         memset(EmptyGroup.Hdr.cName, 0, sizeof(EmptyGroup.Hdr.cName));
53:         if (bLAN)
54:             wsprintf(EmptyGroup.Hdr.cName, "GEmptyLAN");
55:         else if (hGroup)
56:     wsprintf(EmptyGroup.Hdr.cName, "GEmpty%x", (DWORD) hGroup);
57:         EmptyGroup.Hdr.hRule = hGroup;
58:         FirewallAddRule(&EmptyGroup, &hNewGroup);
59:     }
60:     else
61:     {   DWORD dwSize = sizeof(FW_RULE) + (dwIPCount + Info.dwCount) *
    FW_ADDR_CMD_SIZE + Info.dwXSize;
62:         PFW_RULE pGroup = (PFW_RULE) malloc(dwSize);
63:         if (!pGroup)
64:             return FALSE;
65:
66:         memset (pGroup, 0, dwSize);
67:
68:         // rule header
69:         pGroup->Hdr.dwLength = dwSize;
70:         pGroup->Hdr.dwFwVersion = FW_VERSION_GROUP;
71:         if (bLAN)
72:             wsprintf(pGroup->Hdr.cName, "GroupLAN");
73:         else if (bRZone)
74:             wsprintf(pGroup->Hdr.cName, "GroupRZone");
75:         else if (hGroup)
76:             wsprintf(pGroup->Hdr.cName, "Group%x", (DWORD) hGroup);
77:         pGroup->Hdr.hRule = hGroup;
78:         pGroup->Hdr.dwFlags = FW_RFLAGS_ENABLED;
79:         pGroup->Hdr.dwPosition = FW_RPOS_GROUP;
80:         pGroup->Hdr.dwAction = FW_ACTION_GROUP;
81:
82:         // adapter subnets
83:         BYTE *pbCmd;
84:         DWORD i = 0;
85:         bAddCmd = dwIPCount != 0;
86:         if (dwIPCount)
87:         {PFW_RULE_IP_ADDR pAddr = (PFW_RULE_IP_ADDR) &pGroup->rCode;
88:             if (dwFWLZFlags & FWLZ_NETWORKS)
89:             {   PVR_NETWORK pNetwork = FindFirstNetwork(TRUE);
90:                 while (pNetwork)
91:                 {
92:                     if (!(pNetwork->dwNetAddr))
93:                         continue;
94:
95:                     pAddr->bCmd = FWR_CMD_IP_ADDR;
96:                     pAddr->bOpe = FWR_OPE_MASK_EQ;
97:                     pAddr->dwSubProtocol = NET_PROTO_IP_ALL;
98:                     pAddr->dwAddr1 = pNetwork->dwNetAddr;
99:                     pAddr->dwAddr2 = pNetwork->dwNetMask;
100:
101:                    pAddr++;
102:                    if (i++)
103:                    {pbCmd = (BYTE *) pAddr;
104:                     *pbCmd = FWR_CMD_OR;
105:                     pAddr = (PFW_RULE_IP_ADDR) (pbCmd + 1);
106:                    }
```

-continued

```
107:            if (i >= dwIPCount)
108:                break;
109:
110:            pNetwork = pNetwork->NextNetwork(TRUE);
111:        }
112:    } // FWLZ_NETWORKS
113:    if (dwFWLZFlags & FWLZ_ADAPTERS)
114:    {    PVR_ADAPTER pAdapter = FindFirstAdapter(AL_LAN);
115:        while (pAdapter)
116:        {
117:            for (DWORD j = 0; j < pAdapter->dwIpCount; j++)
118:            {
119:                if (!pAdapter->IpInfo[j].dwAddr)
120:                    continue;
121:
122:                pAddr->bCmd = FWR_CMD_IP_ADDR;
123:                pAddr->bOpe = FWR_OPE_MASK_EQ;
124:                pAddr->dwSubProtocol = NET_PROTO_IP_ALL;
125:                pAddr->dwAddr1 = pAdapter->IpInfo[j].dwAddr;
126:                pAddr->dwAddr2 = pAdapter->IpInfo[j].dwMask;
127:
128:                pAddr++;
129:                if (i++)
130:                {    pbCmd = (BYTE *) pAddr;
131:                    *pbCmd = FWR_CMD_OR;
132:                    pAddr = (PFW_RULE_IP_ADDR) (pbCmd + 1);
133:                }
134:                if (i >= dwIPCount)
135:                {    pAdapter = NULL;
136:                    break;
137:                }
138:            }
139:            if (pAdapter)
140:                pAdapter = pAdapter->NextAdapter(AL_LAN);
141:        }
142:    } // FWLZ_ADAPTERS
143:        query.dwCookie = (DWORD) pAddr;
144:    }
145:    else
146:        Query.dwCookie = (DWORD) &pGroup->rCode;
147:
148:
149:    // ip sets
150:    if (Info.dwCount)
151:    {    query.callback = UGCallback;
152:        if (bLAN)
153:            LZEnumContentsEx((HCONTEXT) hLocalContext, &query);
154:    ...
155:    }
156:    // add it
157:    FirewallAddRule(pGroup, &hNewGroup);
158:    free (pGroup);
159: }
160:
161:    // success
162:    if (hNewGroup)
163:    {   if (bLAN)
164:        {  hLANGroup = hNewGroup;
165:            // wait 'til FirewallInitRules to do this if we're initializing (bFWInit == FALSE)
166:            if (bFWInit)
167:                FirewallUpdateCastRule( );
168:        }
169:        ...
170:        return TRUE;
171:    }
172:    return FALSE;
173: }
```

Of particular interest is the portion of the above FirewallUpdateLANGroup function on lines 36–40 that enumerates the contents of the local (or trusted) zone and the remote (or untrusted) zone that are stored in the rules engine. The function next builds up a list of firewall group entries based upon the contents of updated zones. In particular, in lines 113 to 136, the function runs through the network list and fills in a data structure describing the contents of the local (trusted) zone. For example, the sequence of code in lines 122 to 127 provides that if an IP address is within a particular subnet (identified by address and subnet mask) then the address is within the local zone that is being developed in this function. When completed, this data structure is, in effect, a set of rules that is sent down to the firewall for enforcement.

On line 157, the "FirewallAddRule" function takes the firewall rules that are built and adds them to firewall. By adding these rules to the firewall, the firewall's notion of what is the trusted zone is updated. When a communication from a particular address is subsequently received, the firewall will apply the updated firewall rules to determine if that address is within the trusted zone.

F. String Comparison Methodology

As each network discovered by the system is profiled, a network identification ("Network ID") string is generated. The AddNetworks function (shown above) includes the logic illustrating how a network identification string is created. The string serves as a unique identifier for each network. The following table illustrates how this Network ID string is created:

| case | Network-ID string | Nice text |
|---|---|---|
| Ethernet, private IP | Gateway IP & mask and MAC Address | Network IP |
| Ethernet, public IP | Gateway IP & mask | Network IP |
| PPPoE | "connection name" | connection name |
| PPP dialup | "connection name" | connection name |
| SLIP dialup | "connection name" | connection name |
| AOL adapter | "connection name" | connection name |
| Token Ring | Gateway IP & mask | Network IP |
| Infrared | Gateway IP & mask | Network IP |

If the network is a dial-up connection with a resolvable connection name, then the string is based on this connection name. In other cases, a string is created that, in effect, serves as a name for a particular network. For example, in the case of an Ethernet connection with a public IP address, Gateway IP and mask are compared. In the case of an Ethernet connection with a private IP address, the MAC address is also compared. The following "GetNetworkCID" function illustrates the creation of the network profile strings.

```
 1: BOOL WINAPI GetNetworkCID(PIP_NETWORK pIPNetwork, CHAR *pChar, DWORD
    dwLen)
 2: {    CHAR cIPAddr[16] = {0};
 3:      CHAR cPhysAddr[18] = {0};
 4:      if (pIPNetwork->dwNetFlags & NWF_NET_ADDR)
 5:          IPAddrToStr(pIPNetwork->dwNetAddr, cIPAddr, sizeof(cIPAddr));
 6:      if (pIPNetwork->dwNetFlags & NWF_PHYS_ADDR)
 7:          EthAddrToStr(pIPNetwork->GWPhysAddr.Eth, cPhysAddr);
 8:      wsnprintf(pChar, dwLen, "NET%s%s%s%s",
 9:          (pIPNetwork->dwNetFlags & NWF_CONN_NAME) ? pIPNetwork->cName : "",
10:          cIPAddr,
11:          (cIPAddr[0] && cPhysAddr[0]) ? "_" : "",
12:          cPhysAddr);
13:      return TRUE;
14: }
```

The above GetNetworkCID function takes an IP_NETWORK as a parameter and converts this into a string. As shown on lines 8 through 12 a string is built based upon the following parameters: (1) name (either the name of the connection or a blank), (2) IP address, (3) an underscore if there is a MAC (or physical) address, and (4) physical address (if there is one).

This string is then compared to the equivalent string for each previously registered "VR_NETWORK." If the strings match, then FindNetwork returns a pointer to matching VR_NETWORK. The parent class of VR_NETWORK is "IP_NETWORK", which is defined as shown below.

```
1:  // Network info
2:  typedef struct {
3:      DWORD       dwNetFlags;                          // how to determine id (see NWF_*)
4:      DWORD       dwNetMask;                           // network mask
5:      DWORD       dwNetAddr;                           // network ip address
6:      PHYS_ADDR   GWPhysAddr;                          // gateway physical address
7:      CHAR        cName[MAX_CONN_NAME_LEN];            // connection name
8:  } IP_NETWORK,   *PIP_NETWORK;
```

G. Application and Use of Trusted Zone Information

Once the local (or trusted) zone is defined or redefined as described above, this information is used to reconfigure the firewall settings. This information can also be consulted and used in various other applications. In the currently preferred embodiment of the present invention, this local zone information is consulted not only in configuration of the firewall, but also in several other security and policy management applications. For example, a security rule of a security application may allow a particular application, such as Microsoft Internet Explorer™, to connect to the local zone, but not to connect to the Internet. When the local zone definition is updated as described above, this also updates the addresses to which this particular application can connect. Similarly, applications that permit access to the local computer from external sources may also consult this local zone definition. For example, an end point security product may permit other computers in the local zone to connect to a particular database application on the local machine, but may not permit access from computers outside the local zone. Further description of an end point security product regulating access to a network may be found in commonly-owned U.S. application Ser. No. 08/851,777, filed May 6, 1997, now U.S. Pat. No. 5,987,611, issued Nov. 16, 1999, the disclosure of which is incorporated by reference.

H. Preferred User Interface

Figure 5:
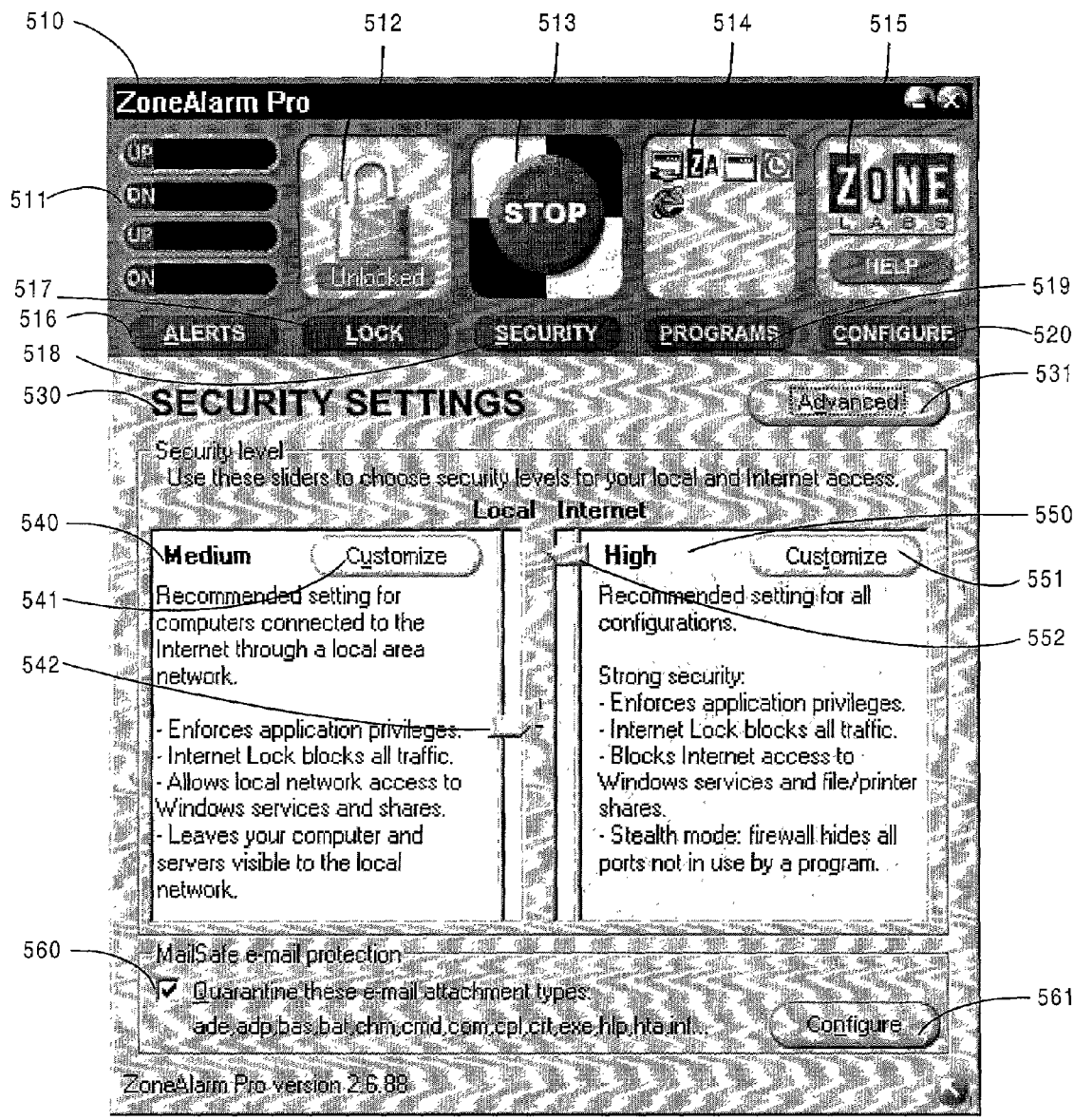
FIG. 5 illustrates a preferred zone configuration interface for configuration of the network detection and firewall configuration system.

FIG. 5 illustrates a preferred zone configuration user interface 500 for the currently preferred embodiment of the present invention. The preferred zone configuration user interface panel 500, includes a toolbar 510 at the top of the panel containing buttons 511 through 520. Button 511 displays the amount of data being sent and received across the Internet. Button 512 enables an administrator or user to lock or unlock access to the Internet. As shown on FIG. 5, button 512 is unlocked, permitting the computer to access the Internet. Button 513 enables the administrator or user to immediately shut off all Internet access. Button 514 displays the programs connected to the Internet. Button 515 provides help information.

Button 516 opens a panel (not shown) that enables the administrator or user to view alerts (instances of outside attempts to access a local computer) and provides options for how such alerts are displayed and stored. Button 517 opens a panel (not shown) that enables the administrator or user to provide settings for "locking" a computer and blocking access to and from the Internet. For example, the administrator or user may provide for access to be blocked after the computer has been inactive for more than 10 minutes. Button 518 opens up a security settings panel, which is displayed on the lower half of FIG. 5 and is described below. Button 519 opens up a program settings panel (not shown). Button 520 opens up a configuration panel (not shown) providing additional configuration options.

This security settings panel 530 permits the user or administrator to define two different groups or "zones" of computers and to apply different security policies to those groups. The first group is the "Local Zone" 540 of trusted computers (shown in on the left side of FIG. 5). This Local Zone is defined by the user or administrator and typically consists of other computers on the LAN. All other computers that are not in the defined Local Zone are placed in the "Internet Zone" 550 (shown on right side of FIG. 5). Buttons 541 and 551 allow the end user certain additional options to customize the security settings for each of the zones. The Local Zone and the Internet Zone each have a security level selector 542 and 552, which are a slide bars that permit the user or administrator to change the security level for each zone. FIG. 5 shows the security level selector 542 for the Local Zone set to medium and the security level selector 552 for the Internet Zone set to high. This provides for a high level of security for unknown computers connected on the Internet and a reduced level of security amongst trusted local computers on the LAN. The MailSafe protection button 560 enables certain types of e-mail attachments to be quarantined and prevented from executing. Button 561 provides a panel for configuration of MailSafe protection.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. A method for a mobile client device to regulate access to different networks that the client device may be connected to, the method comprising:
    automatically obtaining information to identify adapters connected to a particular client device and networks to which said adapters are connected;
    automatically generating a profile for each network, including a current network to which said particular client device is connected;
    automatically comparing said profile of said current network to previously generated profiles to determine if said particular client device has previously connected to said current network; and
    if said particular client device has previously connected to said current network, automatically applying security settings previously utilized for said current network for regulating access to said current network.

2. The method of claim 1, further comprising:
    determining the security settings to be applied for said current network if said particular client device has not previously connected to said current network; and
    applying said security settings for regulating access to said current network.

3. The method of claim 2, further comprising:
    storing said security settings for said current network; and
    automatically applying said security settings when said particular client device subsequently connects to said current network.

4. The method of claim 2, wherein said step of determining the security settings to be applied for said current network includes applying an established policy.

5. The method of claim 4, wherein said established policy includes treating a current network to which said device has not previously connected as untrusted.

6. The method of claim 4, wherein said established policy includes treating a current network to which said device has not previously connected as trusted.

7. The method of claim 4. wherein said established policy includes obtaining user input regarding said security settings.

8. The method of claim 7, wherein said established policy includes security settings to be applied when said user input is not obtained.

9. The method of claim 1, wherein said security settings are applied to a firewall module for regulating access to said current network.

10. The method of claim 1, wherein said step of obtaining information to identify adapters and networks is initiated each time said particular client device is connected to a network.

11. The method of claim 1, wherein information to identify adapters and networks is obtained from an operating system kernel facility.

12. The method of claim 11, wherein changes to network information in said operating kernel facility are examined to determine if an adapter's configuration has changed.

13. The method of claim 11, wherein changes to network information in said operating kernel facility are examined to determine if said current network has changed.

14. The method of claim 1, wherein a list of all adapters is constructed upon connection of said particular client device to a network.

15. The method of claim 14, wherein each said adapter's network configuration is constructed upon connection of said particular client device to a network.

16. The method of claim 14, wherein a profile of all adapters and said adapters' network configuration is constructed each time said particular client device is connected to a network.

17. The method of claim 16, wherein said profile of an adapter includes a selected one or more of: connection method, physical address, IP address, subnet mask, and gateway IP address.

18. The method of claim 16, wherein said profile of an adapter's network configuration includes a selected one or more of: network IP address, network mask, gateway MAC address, and connection name.

19. The method of claim 1, wherein a profile of said adaptors and networks connected to said adapters is constructed each time a change in said adapters' network configuration is detected.

20. The method of claim 1, wherein a network is identified by connection name if said network is a dialup connection with a resolvable connection name.

21. The method of claim 1, wherein a network is identified by connection name if said network is a PPP over Ethernet (PPPoE) connection with a resolvable connection name.

22. The method of claim 1, wherein a network is identified by gateway IP address and subnet mask if said network is an Ethernet network with a public IP address.

23. The method of claim 1, wherein a network is identified by gateway IP address, subnet mask and physical address if said network is an Ethernet network with a private IP address.

24. The method of claim 23, wherein said physical address is a MAC address.

25. The method of claim 1, wherein a network is identified by gateway IP address and subnet mask if said network is a token ring network.

26. The method of claim 1, wherein a network is identified by gateway IP address and subnet mask if said network is an infrared network.

27. The method of claim 1, wherein a unique identifier is assigned to each network that is profiled.

28. The method of claim 27, wherein said unique identifier is based upon a selected one or more of connection name, gateway IP address, subnet mask and physical address.

29. The method of claim 27, wherein each said unique identifier is stored.

30. The method of claim 27, wherein said unique identifier for a current network that is identified is compared to prior identifiers to determine if said particular client device has previously connected to said current network.

31. A method for a mobile device to identify different networks to which said device is connected, the method comprising:
   automatically obtaining information to identify adapters connected to said device and current networks to which said adapters are connected;
   automatically generating a profile for said current networks, including a current network to which said device is connected;
   automatically comparing said profile of said current network to which said device is connected to prior profiles to determine if said device has previously connected to said current network; and
   if said device has not previously connected to said current network, automatically notifying the device's user of a new connection to said current network.

32. The method of claim 31, further comprising:
   if said device has not previously connected to said current network, obtaining user input on particular security settings to be applied for said current network.

33. The method of claim 32, further comprising:
   applying said security settings to regulate access to said device.

34. The method of claim 33, wherein said security settings are applied to a firewall module for regulating access to said device.

35. The method of claim 32, further comprising:
   storing said security settings; and
   applying said security settings when said device subsequently connects to said current network.

36. The method of claim 31, further comprising:
   if said device has previously connected to said current network, applying any security settings previously utilized for said current network for regulating access to said device.

37. The method of claim 31, wherein said profiles of said current networks are used by a policy management application.

38. The method of claim 31, wherein said profiles of said current networks are used by a security management application.

39. The method of claim 31, wherein said profiles of said current networks are used by an end point security product to regulate access to said device.

40. A method for a mobile device to identify different networks to which said device is connected, the method comprising:
   automatically obtaining information to identify a current network to which said device is connected;
   automatically generating a profile for said current network;
   automatically comparing said profile of said current network to previously generated profiles to determine if said device has previously connected to said current network; and
   if said device has not previously connected to said current network, automatically treating said current network as untrusted for purposes of regulating access to said device.

41. The method of claim 40, wherein a firewall module regulates access to said device.

42. The method of claim 40, further comprising:
   notifying the device's user if said device has not previously connected to said current network.

43. The method of claim 42, further comprising:
obtaining user input on particular security settings to be applied to regulate access to said device.

44. The method of claim 43, further comprising:
automatically applying said security settings to a firewall module to regulate access to said device.

45. A method for a mobile device to identify different networks to which said device is connected, the method comprising:
automatically obtaining information to identify a current network to which said device is connected;
automatically generating a profile for said current network;
automatically comparing said profile of said current network to previously stored profiles to determine if said device has previously connected to said current network; and
if said device has not previously connected to said current network, automatically treating said current network as trusted for purposes of regulating access to said device.

46. The method of claim 45, wherein a firewall module regulates access to said device.

47. The method of claim 45, further comprising:
notifying the devise's user if said device has not previously connected to said current network.

48. The method of claim 47, further comprising:
obtaining user input on particular security settings to be applied to regulate access to said device.

49. The method of claim 48, further comprising:
automatically applying said security settings to a firewall module to regulate access to said device.

50. A system for a mobile device to identify different networks to which said device is connected and regulate access to said device, the system comprising:
a network information engine for automatically obtaining and processing information on networks to which said device is connected;
a network information data structure for storing said information automatically collected on said networks, said information uniquely identifying each network, including uniquely identifying local networks having duplicate network addresses; and
a zone configuration module for establishing security settings to regulate access to said device, said security settings being applied automatically in a manner to regulate access to said device based on which uniquely-identified network said device is currently connected to.

51. The system of claim 50, wherein said network information engine constructs a list of all connected adapters upon connection of said device to a network.

52. The system of claim 51, wherein said network information engine constructs a list of all networks connected to said adapters upon connection of said device to a network.

53. The system of claim 51, wherein said network information engine constructs a list of all adapters and networks to which said adapters are connected each time a change in network connection is detected.

54. The system of claim 50, wherein said network information engine obtains information to identify adapters connected to said device from an operating system kernel facility.

55. The system of claim 54, wherein said network information engine obtains information to identify networks connected to said adapters from said operating system kernel facility.

56. The system of claim 54, wherein changes to network information in said operating kernel facility are examined to determine if a current network to which said device is connected has changed.

57. The system of claim 50, wherein said network information engine identifies a network by connection name if said network is a dialup connection with a resolvable connection name.

58. The system of claim 50, wherein said network information engine identifies a network by connection name if said network is a PPPoE connection wit a resolvable connection name.

59. The system of claim 50, wherein said network information engine identifies a network by gateway IP address and subnet mask if said network is an Ethernet network with a public IP address.

60. The system of claim 50, wherein said network information engine identifies a network by gateway IP address, subnet mask and physical address if said network is an Ethernet network with a private IP address.

61. The system of claim 60, wherein said physical address is a MAC address.

62. The system of claim 50, wherein said network information engine identifies a network by gateway IP address and subnet mask if said network is a token ring network.

63. The system of claim 50, wherein said network information engine identifies a network by gateway IP address and subnet mask if said network is an infrared network.

64. The system of claim 50, wherein said network information engine assigns a unique identifier to each network.

65. The system of claim 64, wherein said network information engine constructs said unique identifier based upon a selected one or more of connection name, gateway IP address, subnet mask and physical address.

66. The system of claim 64, wherein each said unique identifier is stored in said network information data structure.

67. The system of claim 64, wherein each said unique identifier is stored in a database.

68. The system of claim 64, wherein said network information engine compares said unique identifier for a current network to previously stored identifiers to determine if said device has previously connected to said current network.

69. The system of claim 50, wherein said zone configuration module stores security settings for regulating access to said device.

70. The system of claim 69, wherein said security settings include whether to treat a network as trusted.

71. The system of claim 69, wherein said security settings include whether to treat a network as untrusted.

72. The system of claim 69, wherein said security settings include treating a current network to which said device has not previously connected as untrusted.

73. The system of claim 69, wherein said security settings include obtaining user input regarding the security settings to be applied for a network.

74. The system of claim 73, wherein said security settings include rules to be applied when user input is not obtained.

75. The system of claim 50, wherein said zone configuration module stores security settings for regulating access from said device to different networks.

76. The system of claim 50, wherein said zone configuration module automatically applies said security settings to a firewall module for purposes of regulating access to said device.

77. The system of claim 50, further comprising:
a firewall module for regulating access to and from said device.

78. The system of claim 77, wherein said zone configuration module automatically applies said security settings to said firewall module for purposes of regulating access to said device.

\* \* \* \* \*